(12) United States Patent
Cierniak et al.

(10) Patent No.: US 9,032,289 B1
(45) Date of Patent: May 12, 2015

(54) PROVIDING SUGGESTIONS TO USERS TO WRITE COMMENTS

(75) Inventors: Michal Cierniak, Palo Alto, CA (US); Gregor Hochmuth, San Francisco, CA (US); Na Tang, San Jose, CA (US)

(73) Assignee: Google Inc., Mountain View, CA (US)

( * ) Notice: Subject to any disclaimer, the term of this patent is extended or adjusted under 35 U.S.C. 154(b) by 826 days.

(21) Appl. No.: 12/816,816

(22) Filed: Jun. 16, 2010

Related U.S. Application Data

(60) Provisional application No. 61/318,243, filed on Mar. 26, 2010.

(51) Int. Cl.
*G06F 17/00* (2006.01)
*G06F 17/30* (2006.01)

(52) U.S. Cl.
CPC .................................. *G06F 17/3089* (2013.01)

(58) Field of Classification Search
CPC ................................................ G06F 17/30867
USPC ................. 715/512, 715, 731, 733, 202, 255; 707/752
See application file for complete search history.

(56) References Cited

U.S. PATENT DOCUMENTS

| | | | | |
|---|---|---|---|---|
| 6,460,036 B1 * | 10/2002 | Herz | | 707/748 |
| 7,124,353 B2 * | 10/2006 | Goodwin et al. | | 715/234 |
| 8,108,255 B1 * | 1/2012 | Robinson et al. | | 705/14.44 |
| 8,190,990 B2 * | 5/2012 | Le | | 715/231 |
| 2008/0021880 A1 * | 1/2008 | Ren et al. | | 707/3 |
| 2008/0071901 A1 * | 3/2008 | Adelman et al. | | 709/223 |
| 2008/0270406 A1 * | 10/2008 | Flavin et al. | | 707/8 |
| 2009/0164913 A1 * | 6/2009 | Davar et al. | | 715/751 |

OTHER PUBLICATIONS

Social Graph API (Labs), Example Applications, http://code.google.com/apis/socialgraph/docs/examples.html, Feb. 8, 2010, page 1.
Social Graph API (Labs), Edge Types, http://code.google.com/apis/socialgraph/docs/edges.html, Feb. 13, 2010, pp. 1-2.
Microformats Wiki, rel-me, http://microformats.org/wiki/rel-me, Apr. 22, 2010, pp. 1-2.

* cited by examiner

*Primary Examiner* — Kavita Padmanabhan
*Assistant Examiner* — Brian Garmon
(74) *Attorney, Agent, or Firm* — Harrity & Harrity, LLP

(57) ABSTRACT

One or more server devices may receive an indication that a particular user has accessed a particular document. The one or more server devices may determine whether the particular document has been flagged as needing comments, and retrieve an author likelihood score for the particular user when the particular document has been flagged as needing comment. The one or more server devices may determine whether the retrieved author likelihood score is greater than a particular threshold, and provide a suggestion to the user to write a comment about the particular document when the author likelihood score is greater than the particular threshold.

21 Claims, 15 Drawing Sheets

| 600 ➔ | | | | | | |
|---|---|---|---|---|---|---|
| USER ID | COMMENT PRODUCTIVITY SCORE | SOCIAL GRAPH PRODUCTIVITY SCORE | EXPERT POSTINGS SCORE | AUTHOR LIKELIHOOD SCORE | INTERESTS AND EXPERTISE | URL HOT LIST |
| 610 | 620 | 630 | 640 | 650 | 660 | 670 |

FIG. 6

| 700 ➔ | | | | | | |
|---|---|---|---|---|---|---|
| DOCUMENT ID | NUMBER OF EXPLICIT REQUESTS | NUMBER OF IMPLICIT REQUESTS | TOPICS | POPULARITY SCORE | NEED COMMENTS FLAG | OBJECTIVE RANK SCORE |
| 710 | 720 | 730 | 740 | 750 | 760 | 770 |

FIG. 7

PROVIDING SUGGESTIONS TO USERS TO WRITE COMMENTS

RELATED APPLICATIONS

This application claims priority under 35 U.S.C. §119 based on U.S. Provisional Patent Application No. 61/318,243, filed Mar. 26, 2010, the entire contents of which are hereby incorporated by reference.

BACKGROUND

Many techniques are available to users today to find information on the world wide web ("web"). For example, users often use web browsers and/or search engines to find information of interest. A user may enter a search query into a search box of a browser and the browser may submit the search query to a search engine. The search engine may identify documents that match the search query, rank the documents based on various factors, and return a ranked list of documents to the user. The user may select a document from the list and request the document. A browser may retrieve the requested document and display the document to the user in a browser window. A browser may provide additional information to a user when a user requests a document. The additional information may include content created by other users in relation to the document. Creating additional content for some documents may be more useful than for other documents. Furthermore, users may have different preferences for authoring content. Thus, the opportunities for creating additional content for documents may be overwhelming.

SUMMARY

According to one aspect, a method, performed by one or more server devices, may include receiving, by one of the one or more server devices, an indication that a particular user has accessed a particular document; determining, by a processor associated with the one or more server devices, whether the particular document has been flagged as needing comments; retrieving, by a processor associated with the one or more server devices, an author likelihood score for the particular user, where the author likelihood score estimates a likelihood that the particular user will become an author of comments about the particular document, in response to determining that the particular document has been flagged as needing comments; determining, by a processor associated with the one or more server devices, whether the retrieved author likelihood score is greater than a particular threshold; and providing, by one of the one or more server devices, a suggestion to the user to write a comment about the particular document, in response to determining that the retrieved author likelihood score is greater than the particular threshold, and in response to determining that the particular document has been flagged as needing comments.

According to another aspect, a server device may include a memory to store a user profile that includes an author likelihood score of a particular user, where the author likelihood score estimates a likelihood that the particular user will become an author of comments about the particular document; and a processor to execute instructions to implement a user statistics component that may determine the author likelihood score for the particular user, and may determine one or more subjective criteria associated with the particular user; a flagging component that may identify documents in need of comments, and may determine whether a particular document accessed by the particular user has been flagged as needing comments; and a suggestion manager component that may receive an indication that the particular user has accessed the particular document, may determine whether the author likelihood score of the particular user is greater than a particular threshold, and may provide a suggestion to the particular user to write a comment about the particular document if the author likelihood score of the particular user is greater than the particular threshold and if the particular document has been flagged as needing comments.

According to yet another aspect, one or more memory devices, that include instructions executable by one or more processors, may include one or more instructions to receive an indication that a particular user has accessed a particular document; one or more instructions to determine whether the particular document has been flagged as needing comments; one or more instructions to determine whether the particular document relates to the particular user's interests or areas of expertise; one or more instructions to retrieve an author likelihood score for the particular user, where the author likelihood score estimates a likelihood that the particular user will become an author of comments about the particular document, in response to determining that the particular document has been flagged as needing comments or determining that the particular document relates to the user's interests or areas of expertise; one or more instructions to adjust the retrieved author likelihood score based on one or more subjective criteria associated with the particular user; one or more instructions to determine whether the adjusted author likelihood score is greater than a particular threshold; and one or more instructions to provide an instruction, to a client device associated with the particular user, to provide a suggestion to the user to write a comment about the particular document, in response to determining that the adjusted author likelihood score is greater than the particular threshold.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 6 is a diagram of exemplary data fields of a user profile record that may be stored in the user profile database of FIG. 4;

FIG. 7 is a diagram of exemplary data fields of a document record that may be stored in the flagged documents database of FIG. 4;

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Overview

An implementation described herein may relate to identifying documents that need comments. Additionally or alternatively, an implementation described herein may relate to identifying users that are likely to write comments about documents. Furthermore, an implementation described herein may relate to identifying whether a particular user is likely to write a comment about a particular document that the user has accessed, and providing a suggestion to the user to write a comment about the accessed document, if it is determined that the user is likely to write a comment.

For some documents, users might like to see other documents that comment on the contents of these documents. These "other" documents might take various forms and will be referred to herein as "comments." A comment, also known as an annotation or a review, may include any document (or a portion of a document) that provides an opinion of, or otherwise remarks upon, the contents of another document. A comment may be identified as a comment by being stored in a particular database. Alternatively, or additionally, a comment may be identified as a comment by being labeled as a comment and being associated with a particular document, and may be available for presentation with the particular document. In other words, a user may be able to view comments in connection with the document with which the comments are associated.

A "document," as the term is used herein, is to be broadly interpreted to include any machine-readable and machine-storable work product. A document may include, for example, an e-mail, a web page or a web site, a file, a combination of files, one or more files with embedded links to other files, a news group posting, a news article, a blog, a business listing, an electronic version of printed text, a web advertisement, etc. In the context of the web (i.e., the Internet), a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1A:
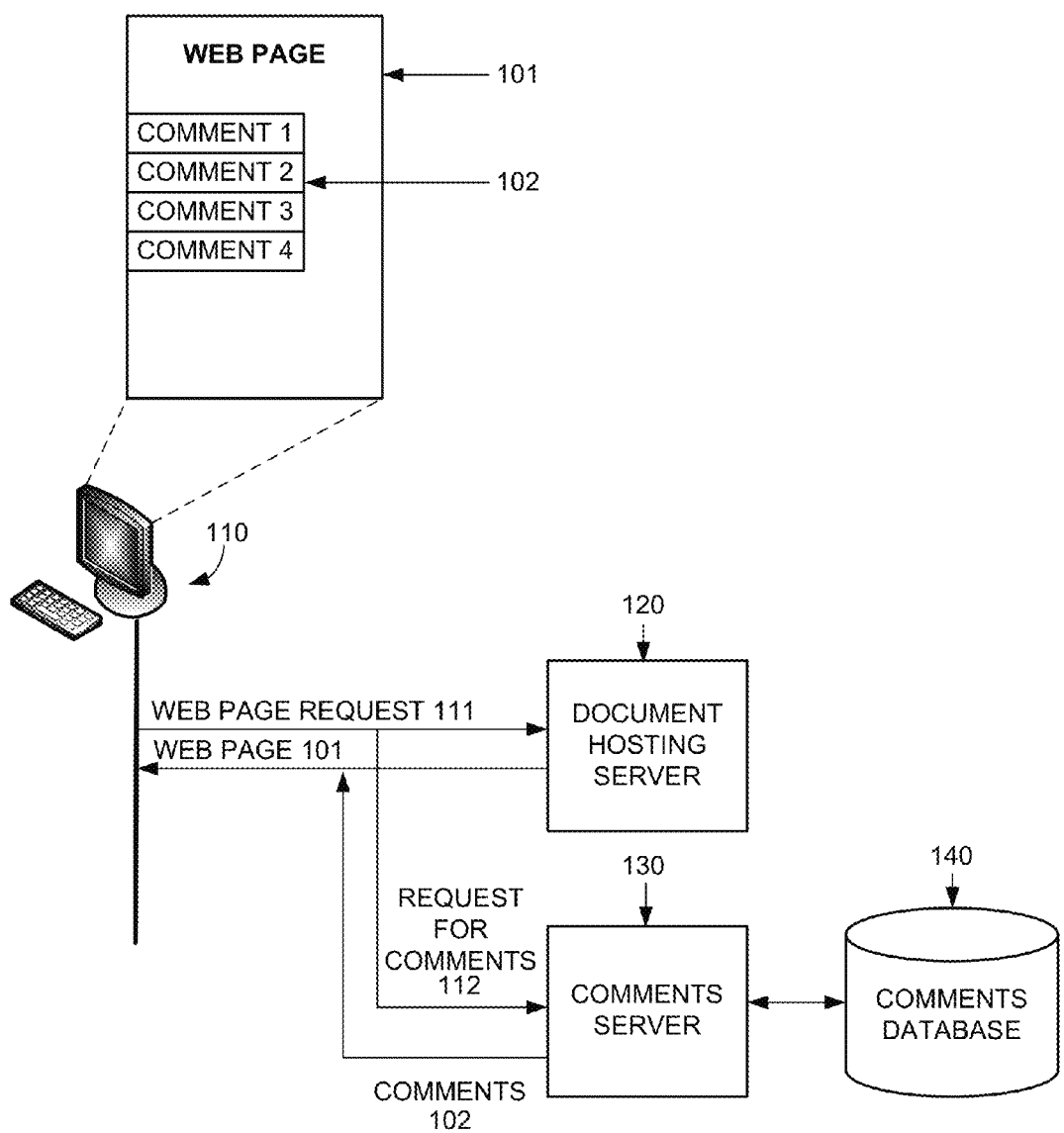
FIGS. 1A-1C are diagrams illustrating an overview of an exemplary implementation described herein.
Figure 1B:
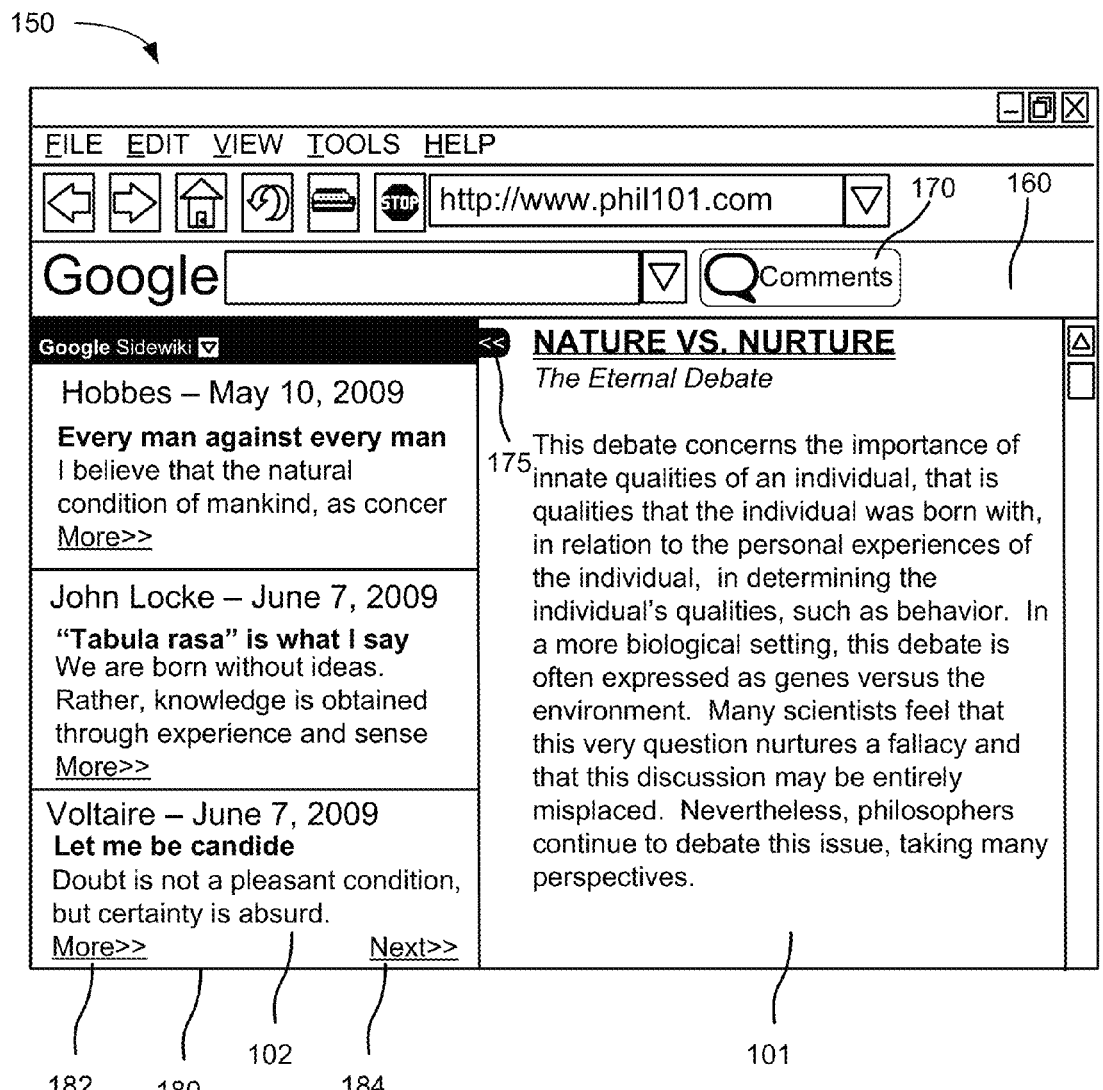
Figure 1C:
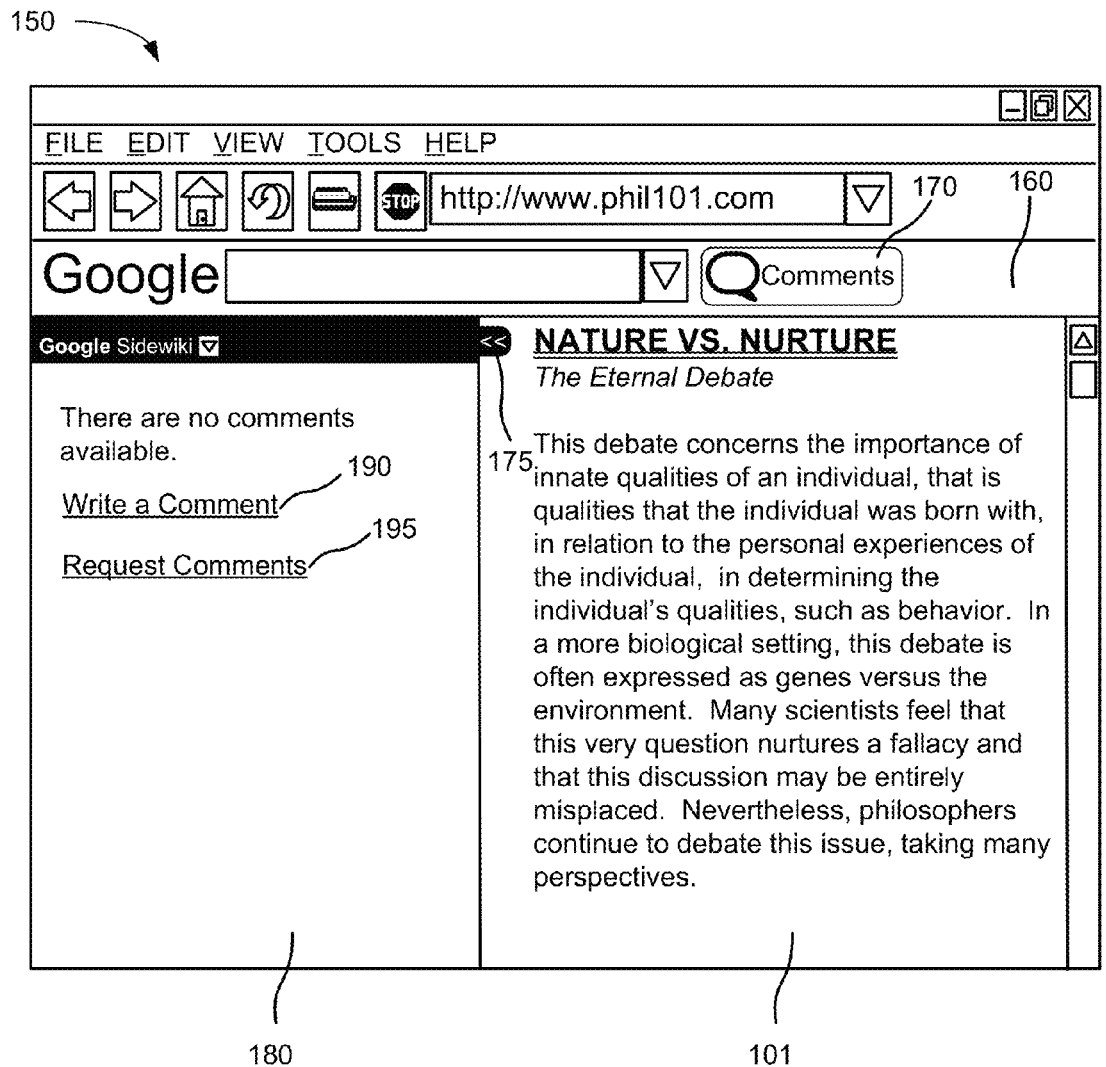

FIGS. 1A-1C are diagrams illustrating an overview of an exemplary implementation described herein. A user may access (i.e., visit) a web page 101 by using a browser installed on client device 110. One way of creating (or modifying) comments 102 about web page 101 may include using a browser add-on application installed on the browser. However, comments may also be created (or modified) in other ways. In one implementation, the browser add-on application may include a toolbar 160 (FIG. 1B) that may be displayed in a browser window and provide one or more selectable visual objects (e.g., buttons), one or more search boxes, and/or one or more indicators (e.g., icons, message displays, etc.). One example of such a browser add-on application may include the GOOGLE Toolbar with Sidewiki. In another implementation, the browser add-on application may not include a toolbar. For example, the browser add-on application may not have any elements associated with it that are visible to a user of the browser. The browser add-on application may include a first function (e.g., a button) for creating (or modifying) comments about the document that is being displayed by the browser, and a second function for viewing comments, about the document, that were created by other users.

A user may request web page 101 by, for example, selecting a link to web page 101 displayed within another document in the browser, or by typing a Uniform Resource Locator (URL) of web page 101 into an address box of the browser. In response, client device 110 may send a web page request 111 to document hosting server 120 to request web page 101. Document hosting server 120 may send web page 101 to client device 110, allowing client device 110 to display web page 101.

Additionally, client device 110 may send a request for comments 112 to comments server 130, in response to web page request 111. Comments server 130 may search comments database 140 to identify comments associated with web page 101, and may provide comments 102 to client device 110, allowing client device 110 to display comments 102 in connection with web page 101. Comments 102 may be stored in a local cache associated with the browser and may be subsequently displayed in response to a user action.

FIG. 1B illustrates browser window 150 as it may be initially displayed to the user. Browser window 150 may include web page 101, toolbar 160, comments button 170, and comments window 180. A user may view comments 102 by selecting (e.g., by clicking on) comments button 170, which may cause comments window 180 to be displayed. The user may cause comments 102 to cease being displayed by clicking secondary comments button 175, which may cause comments window 180 to disappear. Comments 102 may include one or more comments that were created about the content of web page 101. Individual comments may not always be displayed in their entirety. Rather, only the name of the author of a comment, the date the comment was created or modified, a subject line, and the first one or two lines of a comment may be displayed, allowing more comments to be displayed at one time. If a user desires to see a full comment, the user may click on a "more" button 182. If a user desires to see more comments, the user may click on "next" button 184.

Some documents may not have any associated comments. For example, no comments may have been written about a particular document. This may be the case, for example, if a document has been recently created, such as a recently published news article, or if a document has not been accessed by any users that are likely to write comments.

FIG. 1C illustrated browser window 150 as it may appear to a user if the user has accessed a document with no comments, after the user selects comments button 170. Comments window 180 may appear without any comments. Rather, comments window 180 may display a "Write a Comment" button 190 and/or a "Request Comments" button 195. Selecting "Write a Comment" button 190 may cause a comment writing interface to appear to the user, allowing the user to write a comment. Selecting "Request Comments" button 195 may allow the user to request comments for the document. In response to selecting "Request Comments" button 195, client device 110 may send an indication to comments server 130 that a user has requested comments for document 101. In response, comments server 130 may flag document 101 as needing comments.

Although FIGS. 1B and 1C show exemplary elements of browser window 150, in other implementations, browser window 150 may contain fewer elements, different components, additional elements, or differently arranged elements than depicted in FIGS. 1B and 1C. Additionally or alternatively, one or more elements of browser window 150 may perform one or more tasks described as being performed by one or more other elements of browser window 150.

When a user accesses a document with no comments, it may be desirable to provide a suggestion to the user to write a comment for the document. A user may be more likely to write a comment for a document, if the user is provided with a suggestion to do so. A user's browsing experience may not always be associated with viewing or writing comments and a user may not always be cognizant of the comments add-on application or of the opportunity to write comments for a document. Furthermore, users may not be viewing comments for a document, and thus may not be aware that a document does not have any comments and/or that users may have requested to see comments for the document. Providing a suggestion to a user to write comments about a particular document may thus inform the user that the particular document needs comments and may motivate the user to write comments about the particular document.

However, users may particularly like to see comments for some documents, and may not care about reading comments for other documents. Therefore, it may be desirable to identify documents that need comments and only provide suggestions for such identified documents. Documents that need comments may be identified based on, for example, requests to see comments for the documents. A user may explicitly request comments by, for example, selecting "Request Comments" button 195. When a user selects comments button 170 for a particular document, to view comments for the particular document, it may be considered an implicit request for comments. Some documents may be identified as needing comments based on a type of document. Users may want to see comments for particular types of documents. For example, users may want to see comments for recent news articles; documents associated with products, businesses, books, or published papers; highly ranked documents regarding popular topics; and/or documents being discussed on blogs and/or microblogs.

Furthermore, some users may not be likely to write comments. For example, most users of the comments add-on application may be passive users that read comments but that do not contribute any content themselves. Providing suggestions to users that are not likely to contribute comments may be unproductive and may annoy such users and detract from their browsing experience. Therefore, it may be desirable to identify users that are likely to become authors of comments. A user may be identified as a likely author if the user has written comments in the past, if the user has generated content in other online settings (e.g., blogs) associated with the user, or if the user has generated content requiring expertise in a particular area (e.g., the user has sent post requests to a web site associated with a particular topic). Moreover, users may be more likely to write a comment about a document that is in the user's area of expertise or that is related to the user's interests. Therefore, topics associated with a document accessed by a user may be compared to the user's areas of expertise or the user's interests.

When a user accesses a document, if the document has been identified as a document in need of comments or if the document has been identified as relating to a user's expertise or interests, and if the user is identified as a likely author of comments, a suggestion may be provided to the user to write a comment about the document.

Some users may be active authors of comments. For example, a user may dedicate one or two hours each week to writing comments for documents. Such users may want to know where to direct their efforts. An implementation described herein may provide a ranked list of documents in need of comments to a user that is an active author of comments.

Exemplary System

Figure 2:
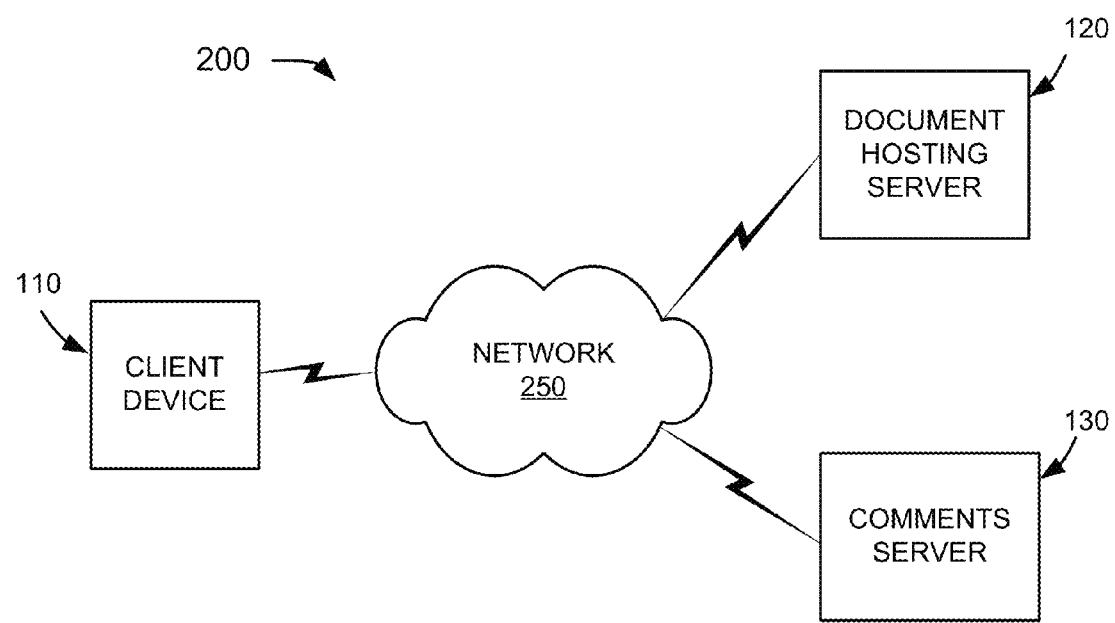
FIG. 2 is a diagram of an exemplary environment in which systems and methods described herein may be implemented.

FIG. 2 is a diagram of an exemplary system 200 in which systems and/or methods described herein may be implemented. System 200 may include client device 110, document hosting server 120, comments server 130, and network 250.

Client device 110 may include a communication or computation device, such as a personal computer, a wireless telephone, a personal digital assistant (PDA), a lap top, or another type of computation or communication device. In one implementation, a client device 110 may include a browser that permits documents to be searched and/or accessed. Client device 110 may also include software, such as a plug-in, an applet, a dynamic link library (DLL), or another executable object or process, that may operate in conjunction with (or be integrated into) the browser to obtain and display comments. Client device 110 may obtain the software from document hosting server 120, comments server 130, or from a third party, such as a third party server, disk, tape, network, CD-ROM, etc. Alternatively, the software may be pre-installed on client device 110. For the description to follow, the software will be described as integrated into the browser.

Document hosting server 120 may include one or more server devices that host document content, such as web page 101. Comments server 130 may include one or more server devices that gather, process, search, and/or maintain documents in a manner described herein. In one implementation, comments server 130 may gather, process, and/or maintain comments that are associated with particular documents. It may be possible that comments server 130 is implemented as a single server device. It may also be possible that comments server 130 is implemented as two or more separate (and possibly distributed) devices.

Comments server 130 may identify documents that need comments and may flag the identified documents as needing comments. Comments server 130 may maintain, or be associated with, a database of documents flagged as needing comments. Additionally or alternatively, comments server 130 may identify users that are likely to become authors of comments. Comments server 130 may maintain, or be associated with, a database, of user profiles, that stores information about which users are likely to become authors of comments. Comments server 130 may receive indications from client device 110 that a particular user has accessed a particular document and may determine, in response, whether to provide a suggestion to the particular user to write a comment about the particular document. Additionally, or alternatively, comments server 130 may provide a list of documents needing comments to a particular user, where the list of documents needing comments is ranked based on objective criteria and/or subjective criteria relating to the particular user.

Network 250 may include any type of network, such as a local area network (LAN), a wide area network (WAN), a metropolitan area network (MAN), a wireless network, such as a general packet radio service (GPRS) network, an ad hoc network, a telephone network (e.g., the Public Switched Telephone Network (PSTN) or a cellular network), an intranet, the Internet, or a combination of networks. Client device 110, document hosting server 120, and comments server 130, may connect to network 250 via wired and/or wireless connections.

Although FIG. 2 shows exemplary components of system 200, in other implementations, system 200 may contain fewer components, different components, additional components, or differently arranged components than depicted in FIG. 2. Additionally or alternatively, one or more components of system 200 may perform one or more tasks described as being performed by one or more other components of system 200.

Exemplary Devices

Figure 3:
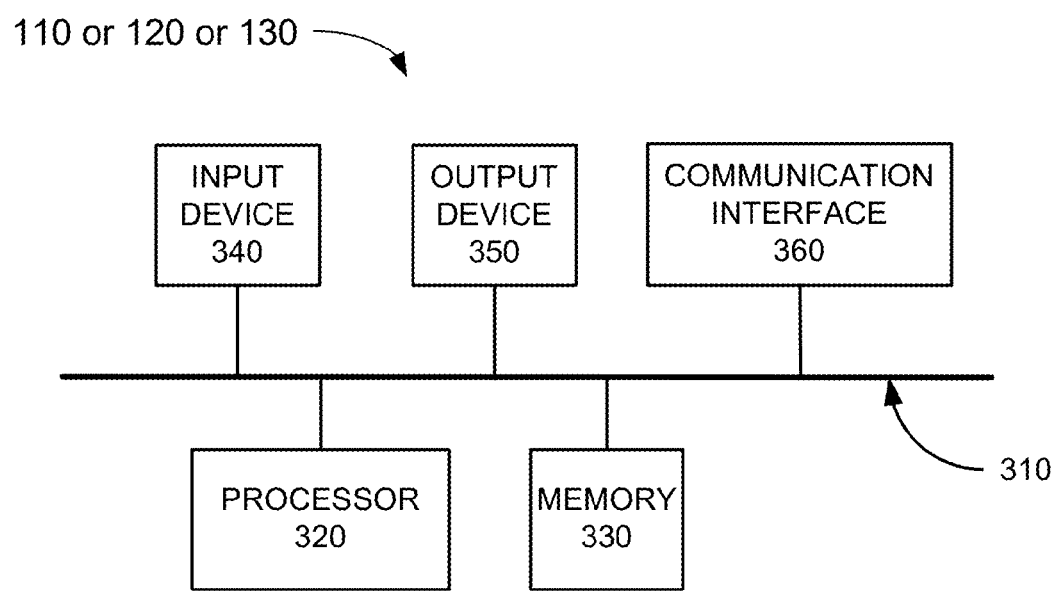
FIG. 3 is a diagram of exemplary components of a client device or a server device of FIG. 2.

FIG. 3 is a diagram of exemplary components of a client or server device (hereinafter called "client/server device"), which may correspond to one or more of client device 110, document hosting server 120, or comments server 130. The client/server device may include a bus 310, a processor 320, a memory 330, an input device 340, an output device 350, and a communication interface 360.

Bus 310 may include a path that permits communication among the components of the client/server device. Processor 320 may include a processor, a microprocessor, or processing logic (e.g., an application specific integrated circuit (ASIC) or a field programmable gate array (FPGA)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to the client/server device, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables the client/server device to communicate with other devices and/or systems. For example, communication interface 360 may include mechanisms for communicating with another device or system via a network, such as network 250. For example, communication interface 360 may include a modem, a network interface card, or a wireless interface card.

As will be described in detail below, the client/server device may perform certain operations relating to the processing of comments. The client/server device may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of client device 110, document hosting server 120, or comments server 130, in other implementations, client device 110, document hosting server 120, or comments server 130, may contain fewer components, different components, additional components, or differently arranged components than depicted in FIG. 3. Additionally or alternatively, one or more components of client device 110, document hosting server 120, or comments server 130, may perform one or more tasks described as being performed by one or more other components of client device 110, document hosting server 120, or comments server 130.

Figure 4:
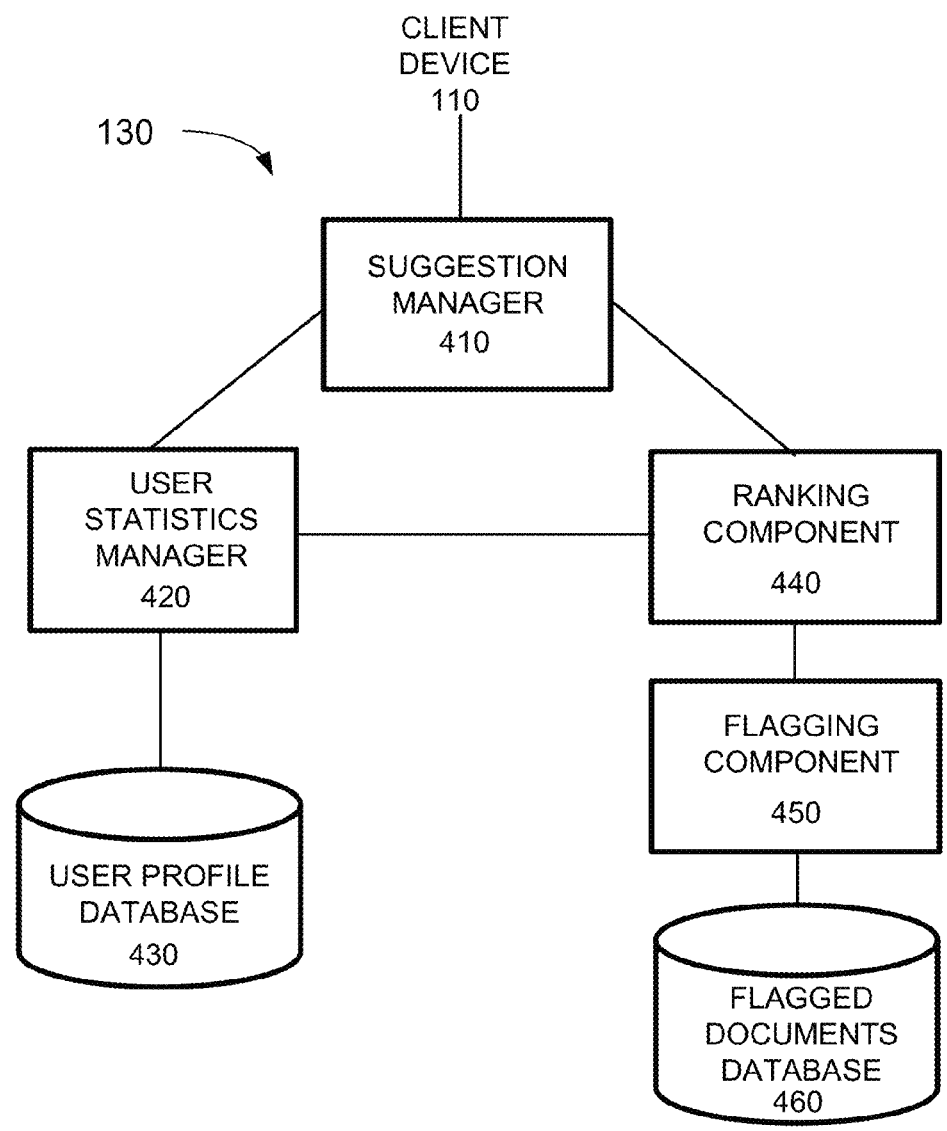
FIG. 4 is a diagram of exemplary functional components of the comments server of FIG. 2.

FIG. 4 is a diagram of exemplary functional components of comments server 130. Comments server 130 may include a suggestion manager 410, a user statistics manager 420, a user profile database 430, a ranking component 440, a flagging component 450, and a flagged documents database 460.

Suggestion manager 410 may receive an indication that a user has accessed a document. For example, suggestion manager 410 may receive an indication from comments add-on application 510 that a user has accessed a particular document. The indication may include, for example, information identifying the accessed document (e.g., a URL of the document) and information identifying the user (e.g., a string which may be used to locate a user profile associated with the user).

Suggestion manager 410 may determine whether to provide a suggestion to the user to write a comment about the accessed document. Suggestion manager 410 may determine whether to provide the suggestion based on whether the accessed document has been flagged as needing comments, whether the accessed document is related to the user's interests, areas of expertise, or geographic area, and based on the user's author likelihood score. Suggestion manager 410 may compare the user's author likelihood score to a suggestion threshold and may provide an instruction to client device 110 to provide a suggestion to the user to write a comment about the accessed document when the user's author likelihood score is greater than the suggestion threshold.

Suggestion manager 410 may provide a list of ranked documents to a user. For example, a user may be an active author of comments and may want to know which documents are the most in need of comments. Suggestion manager 410 may receive a request from a user for a ranked list of documents in need of comments, and may provide a ranked list of documents, in need of comments, to the user. Additionally or alternatively, suggestion manager 410 may provide a ranked list of documents, in need of comments, to a user at periodic intervals without receiving a request for a ranked list of documents, in need of comments, from the user.

User statistics manager 420 may maintain statistics associated with a user. For example, user statistics manager 420 may compute, adjust, or receive from the comments add-on application, a user's comment productivity score. A user's comment productivity score may measure how often a user has written comments in the past. User statistics manager 420 may compute, adjust, or receive from the comments add-on application, a user's social graph productivity score. A user's social graph productivity score may measure how often a user authors content on web sites associated with the user's social graph (described below). User statistics manager 420 may compute, adjust, or receive from the comments add-on application, a user's expert postings score. A user's expert postings score may measure how often the user posts to expert web sites. User statistics manager 420 may compute, adjust, or receive from the comments add-on application, a user's author likelihood score. A user's author likelihood score may measure how likely the user is to write comments, and may be computed based on one or more of the user's comment productivity score, social graph productivity score, or expert postings score.

User statistics manager 420 may determine information about the user's interests and/or areas of expertise. Information about the user's interests and/or areas of expertise may be determined based on the user's browsing history and/or activity, based on information collected from documents accessed by the user, based on input received from the user, or based on any other techniques to obtain information about a user. Furthermore, user statistics manager 420 may determine a URL hot list for a user. A user's URL hot list may list URLs in which the user has expressed a recent interest. User statistics component 420 may store information about the user in user profile database 430.

User profile database 430 may store information, associated with a user and determined by user statistics component 420, in a user profile. In one implementation, a user profile may include, for example, a comment productivity score, a social graph productivity score, an expert postings score, an author likelihood score, information about a user's interests and areas of expertise, and a URL hot list associated with the user.

Ranking component 440 may rank documents that have been flagged as needing comments, before providing documents to suggestion manager 410. Ranking component 440 may rank documents based on one or more objective criteria. The objective criteria may include a quantity of explicit comment requests associated with the particular document, a quantity of implicit comment requests associated with the particular document, a recency of the particular document (e.g., how long ago the particular document was created), a measure of popularity of the particular document, a measure of popularity of the particular document with regard to a particular popular topic, or a measure of popularity of the particular document with respect to one or more blogging or microblogging web sites. A score may be computed for the particular document for each objective criterion and the scores may be combined, based on a weighted sum, into an objective rank score.

Ranking component 440 may receive one or more subjective criteria associated with a user from user statistics manager 420 (or from comments add-on application 510) and may rank documents that have been flagged as needing comments based on the one or more subjective criteria relating to a particular user. The subjective criteria may include whether a particular document relates to the identified user's interests or areas of expertise, whether the particular document's address is included in the user's URL hot list, whether the particular document is associated with the user's geographic area, or whether the particular document is associated with the user's language. A score may be computed for the particular document for each subjective criterion, relating to the particular user, and the scores may be combined, based on a weighted sum, into a subjective rank score.

In one implementation, ranking component 440 may combine the objective rank score and subjective rank score for a document into a combined rank score and may provide a list of ranked documents needing comments based on the combined rank score. In another implementation, ranking component 440 may provide a first list of documents flagged as needing comments, ranked based on objective criteria, to a user and may provide a second list of documents flagged as needing comments, ranked based on subjective criteria relating to the user, to the user.

Flagging component 450 may identify documents that need comments and may flag the documents as needing comments. Flagging component 450 may identify a particular document as needing comments based on receiving explicit or implicit requests for comments for the document from client device 110 (or other client devices).

Flagging component 450 may identify recent news documents without comments and may flag the identified recent news documents as needing comments. Flagging component 450 may identify recent news documents without comments by, for example, accessing a news document index associated with one or more news servers.

Flagging component 450 may identify documents, associated with products, businesses, books, or published papers without comments, as needing comments. Flagging component 450 may identify documents associated with products, businesses, books, or published papers without comments by, for example, accessing indices associated with products, businesses, books, or published papers at one or more servers associated with products, businesses, books, or published papers.

Flagging component 450 may identify documents, with rank scores higher than a particular rank score threshold with respect to popular topics, and without comments, as needing comments. Flagging component 450 may identify documents with rank scores higher than a particular rank score threshold with respect to popular topics by accessing a global document index associated with one or more search engine servers. Furthermore, flagging component 450 may identify documents, without comments, that are being discussed in blogs or microblogs. Flagging component 450 may identify document being discussed in blogs or microblogs by accessing a document index associated with one or more servers that crawl blogging and/or microblogging web sites.

Flagging component 450 may flag identified documents as needing comments if the documents do not have any associated comments (or if the documents do not have any associated comments with a rating higher than a particular rating threshold) and meet one or more other associated criteria (e.g., a particular popularity score, a particular quantity of explicit request for comments, or a particular quantity of implicit requests for comments). Flagging component 450 may store information about the identified documents in flagged documents database 460.

Flagged documents database 460 may store information about documents that have been flagged as needing comments or for which requests for comments have been received. A document record for a document stored in flagged documents database 460 may include, for example, a quantity of explicit requests received for the document, a quantity of implicit requests received for the document, topics associated with the document, a popularity score associated with the document, whether the document has been flagged as needing comments, and an objective rank score associated with the document.

Although FIG. 4 shows exemplary functional components of comments server 130, in other implementations, comments server 130 may contain fewer functional components, different functional components, additional functional components, or differently arranged functional components than depicted in FIG. 4. Additionally or alternatively, one or more components of comments server 130 may perform one or more tasks described as being performed by one or more other components of comments server 130.

Figure 5:
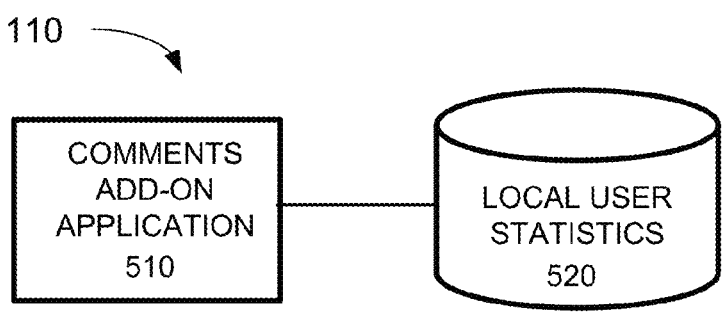
FIG. 5 is a diagram of exemplary functional components of the client device of FIG. 2.

FIG. 5 is a diagram of exemplary functional components of client device 110. Client device 110 may include a comments add-on application 510 and local user statistics database 520.

Comments add-on application 510 may include, among other functions, functions that allow a user to create or modify comments, access comments created by other users, request comments for a document, and provide statistics, associated with a user, to comments server 130. Comments add-on application 510 may operate in connection with a main browser application, such as, for example, GOOGLE CHROME, MOZILLA FIREFOX, MICROSOFT INTERNET EXPLORER, APPLE SAFARI, NETSCAPE NAVIGATOR, or Opera.

Comments add-on application 520 may request comments from comments server 130 and store any received comments in comments cache 530. In one implementation, comments add-on application 520 may send request for comments 112 automatically in response to a user visiting web page 101 and may receive any comments from comments server 130 based on a determination by comments server 130 as to whether to automatically send comments. In another implementation, comments add-on application 520 may make a determination as to whether to automatically request comments based on one or more criteria, such as the particular document a user is visiting, user statistics associated with the user's past history of accessing comments, a type and/or version of the browser application that the user is using, a browser add-on application version that the user is using, or temporal information associated with the document visit.

Local user statistics database 520 may store statistics associated with the user. For example, local user statistics database 520 may store information that, if provided to comments server 130, may violate the user's privacy. For example, local user statistics database 520 may store information about posts that the user makes to expert web sites, may store the user's browsing history, may store keywords associated with the user's posts or the user's browsing history, and comments add-on application 510 may compute scores based on the user's activities and/or private information associated with the user. The computed scores may be sent to comments server 130 by comments add-on application 510 with an anonymous identifier string, which may be used to locate a user profile associated with a user, without revealing the user's identity.

Although FIG. 5 shows exemplary functional components of client device 110, in other implementations, client device 110 may contain fewer functional components, different functional components, additional functional components, or differently arranged functional components than depicted in FIG. 5. Additionally or alternatively, one or more functional components of client device 110 may perform one or more tasks described as being performed by one or more other functional components of client device 110.

FIG. 6 is a diagram of exemplary data fields of a user profile record 600 that may be stored in user profile database 430 of FIG. 4. User profile record 600 may include a user identification (ID) field 610, a comment productivity score field 620, a social graph productivity score field 630, an expert postings score field 640, an author likelihood score field 650, an interests and expertise field 660, and a Uniform Resource Locator (URL) hot list field 670.

User ID field 610 may store information that identifies a particular user. In one implementation, user ID field 610 may not include any information that may be used to determine a user's actual identity. For example, user ID field 610 may include a string that may be matched to a string, identifying a user, included in a request for comments received from client device 110.

Comment productivity score field 620 may store a score that measures a user's comment productivity. The comment productivity score may be based on whether a user has previously written comments about documents. In one implementation, each time a user writes a comment, the user's comment productivity score may be increased. Additionally or alternatively, a user's comment productivity may be based on an average amount of time that elapses between two instances of a user writing a comment or how much time has elapsed since the user has written a comment, and/or how many documents the user has accessed since writing a comment. Thus, for example, if a particular period of time has passed since the user has authored a comment, or if the user has accessed a particular number of documents since the user has authored a comment, the user's comment productivity score may be decreased.

Social graph productivity score field 630 may store a score that measures a user's productivity associated with the user's social graph. A user's social graph may include online content that may be identified as relating to the user. For example, a user's social graph may include the user's homepage or any other document primarily about the user; the user's accounts associated with social networking web sites (e.g., FACEBOOK, MYSPACE, LINKEDIN, BEBO, Meetup, Orkut, etc.); the user's accounts associated with blogging web sites (e.g., BLOGGER, LIVEJOURNAL, WORDPRESS, etc.); the user's accounts associated with microblogging or liveblogging web sites (e.g., GOOGLE Buzz, TWITTER, TUMBLR, Plurk, etc.); the user's accounts associated with social news or bookmarking web sites (e.g., Digg, REDDIT, Delicious, SLASHDOT, etc.); the user's accounts associated with content sharing web sites (e.g., YOUTUBE, Picasa, FLICKR, etc.); the user's accounts associated with review web sites (e.g., YELP, AMAZON, etc.), etc.

In one implementation, accounts associated with a user's social graph may be determined based on public links associated with the accounts. For example, accounts associated with the user's social graph may be identified based on a rel="me" attribute associated with a link. A rel="me" attribute may indicate that a link points to a document that is about the same person as the document that includes the link. In other implementations, accounts associated with a user's social graph may be identified using other techniques. For example, accounts associated with a user may be identified by asking the user to specifically provide information about the user's accounts, or by searching the Internet for accounts that include the user's name or other information that may uniquely identify the user.

A user's social graph productivity score may be determined based on how much content a user has provided in connection with the user's accounts or how often the user updates the accounts. For example, if the user provides updates to a blogging or microblogging account at a particular frequency, the user's social productivity score may be increased.

Expert postings score field 640 may store a score that measures whether a user has provided posts to web sites associated with a particular area of expertise. Examples of web sites associated with a particular area of expertise may include public encyclopedia articles (e.g., WIKIPEDIA or a wiki web site associated with a particular topic) or forums or message boards associated with a particular topic. For example, if a user is a WIKIPEDIA author, the user's expert postings score may be increased.

Author likelihood score field 650 may store a score that indicates a likelihood that a user will become an author of comments. The author likelihood score of a user may be based on one or more of a comment productivity score of the user, a social graph productivity score of the user, or an expert postings score of the user.

Interests and expertise field 660 may store interests and areas of expertise associated with the user. Interests of the user may be determined, for example, based on the user's browsing history. Topics associated with documents accessed by the user may be stored as the user's interests. The user's areas of expertise may be determined, for example, based on posts or articles authored by the user for web sites associated with a particular topic, and may be stored as the user's areas of expertise. Additionally or alternatively, a user may be prompted to enter the user's interests and areas of expertise, and this information may be stored in the interests and expertise field 660.

URL hot list field 670 may store URLs in which the user has expressed a recent interest. A particular URL may be stored in URL hot list field 670, for example, if a user accesses a document associated with the particular URL at least a particular number of times within a particular time period. A particular URL may be stored in the URL hot list field 670 if the user has mentioned the particular URL, or provided a link to the particular URL, in a document associated with the user's social graph. For example, if the user mentions a particular document in a blog, a URL associated with the document may be stored in URL hot list field 670.

Although FIG. 6 shows exemplary fields of user profile record 600, in other implementations, user profile record 600 may contain fewer fields, different fields, additional fields, or differently arranged fields than depicted in FIG. 6. Additionally or alternatively, one or more fields of user profile record 600 may include information described as being included in one or more other fields of user profile record 600. Furthermore, while user profile record 600 has been described as being stored in user profile database 430, one or more field of user profile record 600 may be stored in local user statistics database 520.

FIG. 7 is a diagram of exemplary data fields of a document record 700 that may be stored in the flagged documents database of FIG. 4. Document record 700, associated with a particular document, may be used to rank the particular document, in a list of documents that have been flagged as needing comments. Document record 700 may include a document ID field 710, a number of explicit requests field 720, a number of implicit requests field 730, a topics field 740, a popularity score 750, a need comments flag 760, and an objective rank score field 770.

Document ID field 710 may store a string that uniquely identifies a particular document. For example, document ID field 710 may store a URL associated with a document.

Number of explicit requests field 720 may store a value reflecting a quantity of explicit requests for comments associated with the document. If a user selects "Request Comments" button 195 while accessing a document, this may be considered an explicit request for comments for the document, and the value in number of explicit requests field 720 may be increased.

Number of implicit requests field 730 may store a value reflecting a quantity of implicit requests for comments associated with the document. If a user selects comments button 170 while accessing a document, this may be considered an implicit request for comments for the document, and the value stored in number of implicit requests field 730 may be increased.

Topics field 740 may store information regarding one or more topics associated with the document. The topics may be based, for example, on a hierarchical category scheme. Topics for a document may be determined based on manual entry or based on an automated technique, such as, for example, keyword analysis of the text of a document. Topics field 740 may also include geographic topics. Thus, for example, a document about an expensive Italian restaurant in New York may include the topics "Italian restaurants," "fine dining," and "New York."

Popularity score 750 may include a score that reflects a popularity of the document. The popularity of a document may be based on one or more factors that may include, for example, a global rank of the document, a rank of the document in a particular topic, or a number of times that the document has been accessed in a particular period of time.

Need comments flag 760 may include an indication of whether the document has been flagged as needing comments. For example, need comments flag 760 may be set if a particular quantity of explicit comment requests and/or a particular quantity of implicit comment requests has been received for a document.

Objective rank score field 770 may store an objective rank score that indicates how the document ranks in a list of documents that have been identified as needing comments. The objective rank score for a particular document may be based on one or more objective criteria, including a quantity of explicit comment requests associated with the particular document, a quantity of implicit comment requests associated with the particular document, a recency of the particular document (e.g., how long ago the particular document was created), a measure of popularity of the particular document, a measure of a popularity of the particular document with respect to a particular topic, or a measure of popularity of the particular document with respect to one or more blogging or microblogging web sites. A score may be computed for the particular document for each objective criterion and one or more of the computed scores may be combined, based on a weighted sum, into an objective rank score. The objective rank score may be used to provide a ranked list of documents to a user when the user requests a list of documents that need comments.

Although FIG. 7 shows exemplary fields of document record 700, in other implementations, document record 700 may contain fewer fields, different fields, additional fields, or differently arranged fields than depicted in FIG. 7. Additionally or alternatively, one or more fields of document record 700 may include information described as being included in one or more other fields of document record 700.

Exemplary Processes

Figure 8A:
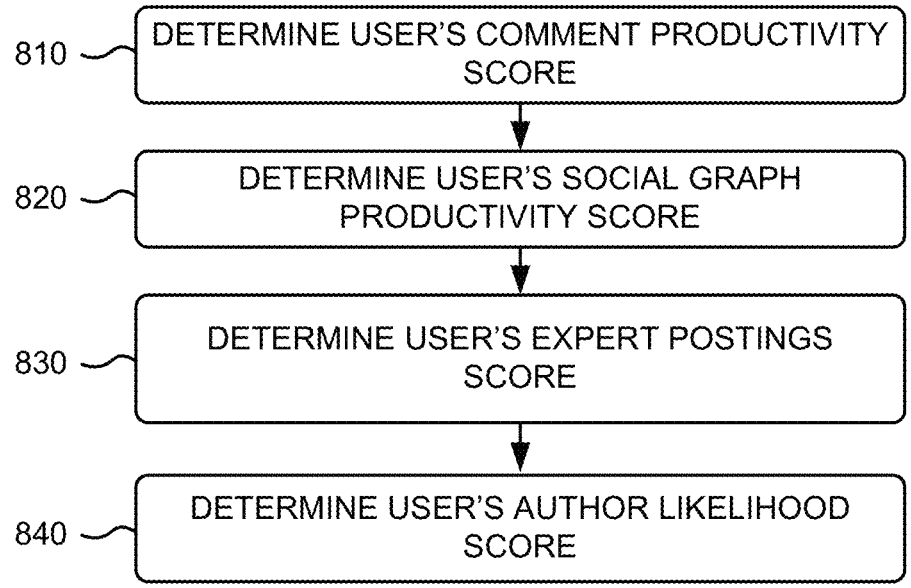
FIG. 8A is a flowchart of an exemplary process for determining an author likelihood score for a user.

FIG. 8A is a flowchart of an exemplary process for determining an author likelihood score for a user. In one implementation, the process of FIG. 8A may be performed by comments server 130. In other implementations, some or all of the process of FIG. 8A may be performed by another device or a group of devices separate from or including comments server 130.

The process of FIG. 8A may include determining a user's comment productivity score (block 810). For example, user statistics manager 420 (or comments add-on application 510) may generate or adjust a user's comment productivity score based on how many comments the user has written and/or based on a period of time over which the comments were written or based on how many documents the user has accessed over the same time period. For example, each time that a user writes a comment, the user's comment productivity score may be increased. As another example, if a particular period of time passes without the user writing a comment, or if the user accesses a particular number of documents without the user writing a comment, the user's comment productivity score may be decreased.

In one implementation, a user's comment productivity score may be based on a logistic function $$\text{(e.g., a } P(T) = \frac{1}{1+e^{-T}}$$

type function, where T represents a quantity of comments written by the user). Thus, a user's comment productivity score may rise rapidly as a function of the number of written comments initially, and may rise slower as the number of written comments increases. Thus, the comment productivity score may distinguish between users that write comments and users that do not write comments. As the percentage of users that actually contribute comments may be small, the fact that a user has written even one comment in the past may be considered significant. The difference between a first user that has written two comments and a second user that has written one hundred comments may not be as significant as the different between a first user that has written one comment and a second user that has never written a comment. In another implementation, the user's productivity score may be based on another type of function.

In one implementation, a user's comment productivity score may additionally be based on how much time has elapsed since the last time the user wrote a comment. For example, the user's productivity score may be set to decay at an exponential rate, starting from a time when the user last wrote and/or edited a comment. A decay constant may be set based on empirical observations. When a user authors another comment, the comment productivity score may be recalculated, based on the new number of comments written by the user, and based on either a non-decayed value of the comment productivity score, a decayed value of the comment productivity, or a combination of a decayed and non-decayed value (e.g., an average of a decayed and non-decayed value). The decay of the comment productivity score may be reset when the user authors a new comment, and a new recalculated comment productivity score may start to decay. In another implementation, the user's comment productivity score may decrease over time, from a time when the user last wrote a comment, in a manner different from an exponential decay function (e.g., linearly). In yet another implementation, the comment productivity score may not decrease over time. The user's comment productivity score may be stored in comment productivity score field 620 of the user's user profile 600.

A user's social graph productivity score may be determined (block 820). For example, user statistics manager 420 (or comments add-on application 510) may generate or adjust a user's social graph productivity score based on how much content a user has provided in connection with the user's accounts or how often the user updates the accounts. For example, user statistics manager 420 (or comments add-on application 510) may identify accounts associated with the user's social graph based on rel="me" links and may determine how often the user posts new content to documents associated with the user's accounts. For example, if a user posts new content a particular number of times within a particular period of time, the user's social graph productivity score may be increased. Thus, for example, if a user posts daily updates to a TWITTER or FACEBOOK account, the user may have a high social graph productivity score. The user's social graph productivity score may be stored in social graph productivity score field 630 of the user's user profile 600.

A user's expert postings score may be determined (block 830). For example, user statistics manager 420 (or comments add-on application 510) may generate or adjust a user's expert postings score based on how much or how often the user provides content to a web site associated with a particular area of expertise. For example, if the user writes a WIKIPEDIA article or posts a comment to a forum or message board, comments add-on application 510 may provide an indication to user statistics manager 420 of comments server 130 to increase the user's expert postings score. The user's expert postings score may be stored in expert postings field 640 of the user's user profile 600.

A user's author likelihood score may be determined (block 840). For example, user statistics manager 420 (or comments add-on application 510) may generate or adjust a user's author likelihood score based on one or more of the user's comment productivity score, the user's social graph productivity score, or the user's expert postings score. The user's author likelihood score may be stored in author likelihood score field 650 of the user's user profile 600.

In order to protect a user's privacy, scores associated with a user may be computed locally using comments add-on application 510, and provided to comments server 130. Thus, comments server 130 may not receive any information associated with particular accounts of the user or particular web sites visited by the user. Rather, comments server 130 may only receive scores associated with the user. This may particularly be the case for the expert postings score, as the user may be posting under an anonymous user name (as opposed to the social graph productivity score, which may be based on public links and public content).

Figure 8B:
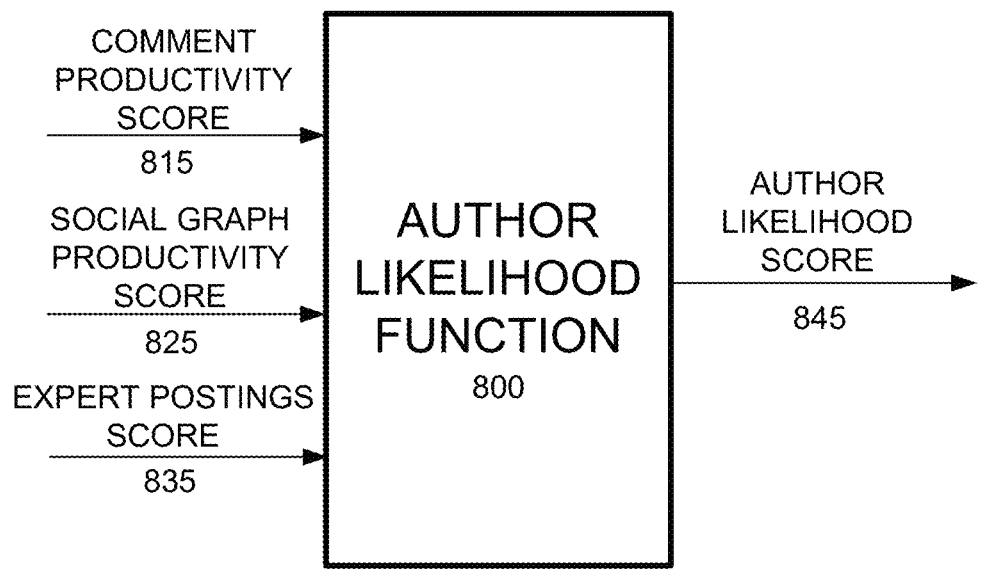
FIG. 8B is a diagram of an exemplary function for generating an author likelihood score for a user.

FIG. 8B is a diagram of an exemplary author likelihood function 800 for generating an author likelihood score for a user. Author likelihood function 800 may, for a particular user, take, as input values, for one or more of the depicted parameters and generate an author likelihood score 845.

In one implementation, author likelihood function 800 may be implemented by comments server 130. In another implementation, author likelihood function 800 may be implemented by the comments add-on application 520 of client device 110.

Author likelihood function 800 may include a comment productivity score input 815 associated with a user. Comment productivity score input 815 may include a measure of whether a user has written comments in the past and/or how often the user has written comments. A benefit of using a comment productivity score as an input to author likelihood function 800 may include identifying users that have written comments in the past. Users that have written comments in the past may be more likely to author comments in the future.

Author likelihood function 800 may include a social graph productivity score input 825 associated with a user. Social graph productivity score input 825 may include a measure of how much content a user posts in association with the user's social graph and/or how often a user posts content in association with the user's social graph. A benefit of using social graph productivity score 825 as an input to author likelihood function 800 may include identifying users that post a lot of online content. Users that post a lot of online content may be more likely to author comments.

Author likelihood function 800 may include an expert postings score input 835 associated with a user. Expert postings score input 835 may include a measure of how much a user posts content to expert web sites and/or how often the user posts content to expert web sites. A benefit of using expert postings score 835 as an input to author likelihood function 800 may include identifying users that post a lot of content regarding particular topics. Users that post a lot of expert content, regarding particular topics, may be more likely to author comments regarding these topics, and/or may be more likely to author comments in general.

One or more of the inputs of author likelihood function 800 may be combined to generate an author likelihood score 845 for a user. In one implementation, inputs of author likelihood function 800 may be combined as a weighted sum. In other words, each of the inputs of author likelihood function 800 may be multiplied by a weight and the results may be added to generate author likelihood score 845. For example, comment productivity score input 815 may be given a greater weight than the other inputs, and thus author likelihood score 845 may depend most significantly on comment productivity score input 815. As another example, expert postings score input 835 may be given more weight than social graph productivity score 825, as users that post expert content may be more likely to provide a useful comment than users that post to social networking web sites. In another implementation, comment productivity score input 815, social graph productivity score input 825, or expert posting score input 835 may not influence author likelihood score 845 unless the values are greater than particular thresholds. For example, social graph productivity score input 825 may not influence a user's author likelihood score 645 unless the user's social graph is associated with a particular level of prolificacy.

Although FIG. 8B shows exemplary inputs of author likelihood function 800, in other implementations, author likelihood function 800 may contain fewer inputs, different inputs, or additional inputs, than depicted in FIG. 8B. Additionally or alternatively, one or more inputs of author likelihood function 800 may include information described as being included in one or more other inputs of author likelihood function 800.

Figure 9:
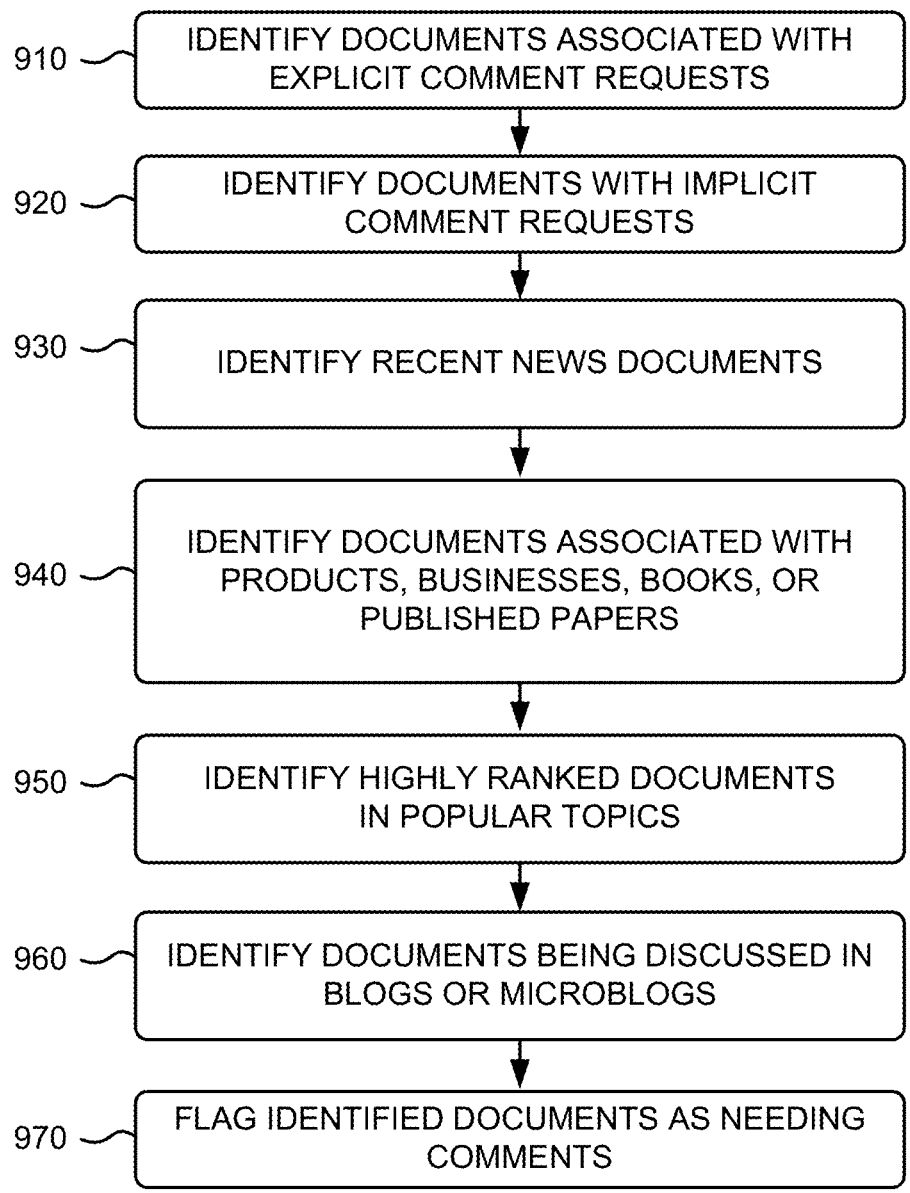
FIG. 9 is a flowchart of an exemplary process for flagging documents that are in need of comments according to an implementation described herein.

FIG. 9 is a flowchart of an exemplary process for flagging documents that are in need of comments according to an implementation described herein. In one implementation, the process of FIG. 9 may be performed by comments server 130. In other implementations, some or all of the process of FIG. 9 may be performed by another device or a group of devices separate from or including comments server 130. In one implementation, the process of FIG. 9 may be applied only to documents that do not have any associated comments. In other words, if at least one user has written a comment about a particular document, the particular document may be removed from consideration when determining whether a document is in need of comments. In another implementation, the process of FIG. 9 may be applied to documents that do not include comments with a particular rating. For example, users may be able to rate comments. A document may be removed from consideration, when determining whether a document is in need of comments, if the document has at least one highly rated comment (e.g., a comment with a combined ratings score, based on ratings of the comment by other users, above a particular rating threshold). However, if a document includes one or more comments, yet none of the comments are highly rated, the document may still be considered as needing comments.

The process of FIG. 9 may include identifying documents associated with explicit comment requests (block 910). For example, flagging component 450 may receive an indication of an explicit request for comments in response to a user selecting "Request Comments" button 195 when accessing a particular document. In response to receiving the indication, flagging component 450 may adjust or generate a value for number of explicit requests field 720 of document record 700 associated with the particular document. A document may be flagged as needing comments if the quantity of explicit comment requests received is greater than an explicit requests threshold. In one implementation, the explicit requests threshold may be set to one. Thus, a single explicit request for comments may be enough to flag the document as needing comments.

Documents associated with implicit comment requests may be determined (block 920). For example, flagging component 450 may receive an indication of an implicit request for comments in response to a user selecting comments button 170 to view comments associated with a particular document. In response to receiving the indication, flagging component 450 may adjust or generate a value for number of implicit requests field 730 of document record 700 associated with the particular document. A document may be flagged as needing comments if the quantity of implicit requests received is greater than an implicit requests threshold. In one implementation, the implicit requests threshold may be set higher than the explicit requests threshold.

Recent news documents may be identified (block 930). For example, flagging component 450 may identify documents that include content associated with recent events and that were created within a particular time period as measured from a current time (e.g., within the last 24 hours). For example, flagging component 450 may be configured to query a crawling server or a news server at particular intervals for indications of news documents associated with recent events. In one implementation, all recent news documents (e.g., created within the last 24 hours), associated with a particular news server, may be flagged as needing comments. In another implementation, recent news documents associated with a particular popularity score, associated with a particular quantity of explicit comment requests, associated with a particular quantity of implicit comment requests, or a combination thereof, may be flagged as needing comments.

Documents associated with products, businesses, books, or published papers may be identified (block 940). For example, flagging component 450 may identify documents associated with products, businesses, books, or published papers. For example, flagging component 450 may be configured to query a crawling server or servers associated with products, businesses, books, or published papers. In one implementation, all identified documents associated with products, businesses, books, or published papers which were created within a particular time period (such as within the last 24 hours), may be flagged as needing comments. In another implementation, particular documents associated with products, businesses, books, or published papers may be flagged as needing comments if the particular documents are associated with a particular time period, associated with a particular popularity score, associated with a particular quantity of explicit comment requests, associated with a particular quantity of implicit comment requests, or a combination thereof.

Highly ranked documents in popular topics may be identified (block 950). For example, flagging component 450 may identify documents associated with a particular topic and associated with a measure of popularity, for the particular topic (or category), greater than a popularity threshold. The popularity of topics may be measured, for example, by a quantity of search queries that include a keyword or phrase associated with a particular topic (or category). The popularity of a document may be measured based on a rank of the document in a search engine ranking for a query associated with the topic, a number of times the document has been accessed by users, or a combination thereof. In one implementation, a particular number of the most highly ranked documents (e.g., documents with a rank score higher than a particular rank threshold) in a popular topic (e.g., a topic with an associated keyword or phrase submitted, by users, in search queries more than a particular quantity of times during a particular period of time) may be automatically flagged as needing comments, if such documents do not include any associated comments. For example, assume that based on a quantity of search queries submitted within a prior 24 hour period, "health care" is determined to be a popular topic. The top ten documents, either tagged with a "health care" topic and/or with the ten highest rank scores with respect to the phrase "health care," which do not have any associated comments, may be flagged as needing comments. In another implementation, highly ranked documents in a particular topic may be flagged as needing comments if the particular documents are associated with a particular time period, associated with a particular quantity of explicit comment requests, associated with a particular quantity of implicit comment requests, or a combination thereof.

Documents being discussed in blogs or microblogs may be identified (block 960). For example, flagging component 450 may identify documents being discussed on blogging or microblogging web sites. Blogging or microblogging web sites may include indications of the most popular keywords and/or most popular web sites being discussed. Flagging component 450 may access highly visited blogging or microblogging web sites (e.g., blogging or microblogging web sites accessed more than a particular quantity of times by users within a particular time period) to access such indications. A particular number of the most popular documents being discussed may be identified. Alternatively or additionally, a particular number of the most popular keywords or phrases being discussed may be retrieved and may be used to identify the most popular document associated with the popular keywords. Thus, for example, flagging component 450 may access the TWITTER web site and determine that the most popular phrase currently being discussed is "health care." Flagging component 450 may then identify the most popular documents associated with a "health care" topic and may determine whether any of the identified documents do not have associated comments (or do not have highly rated associated comments).

In one implementation, a particular number of the most popular documents being discussed may be automatically flagged as needing comments, if such documents do not include any associated comments. In another implementation, a particular number of the most popular documents being discussed may be flagged as needing comments if the particular documents are associated with a particular time period, associated with a particular quantity of explicit comment requests, associated with a particular quantity of implicit comment requests, or a combination thereof.

The identified documents may be flagged as needing comments (block 970). Any documents identified in blocks 910-960 may be flagged if the documents do not have any associated comments (or if the documents do not have any associated highly rated comments) and meet or exceed one or more other associated criteria (e.g., a particular popularity score, a particular quantity of explicit request for comments, or a particular quantity of implicit requests for comments). For example, flagging component 450 may create document records 700 for the identified documents and may set need comments flag 760 for any documents that are flagged as needing comments.

Figure 10:
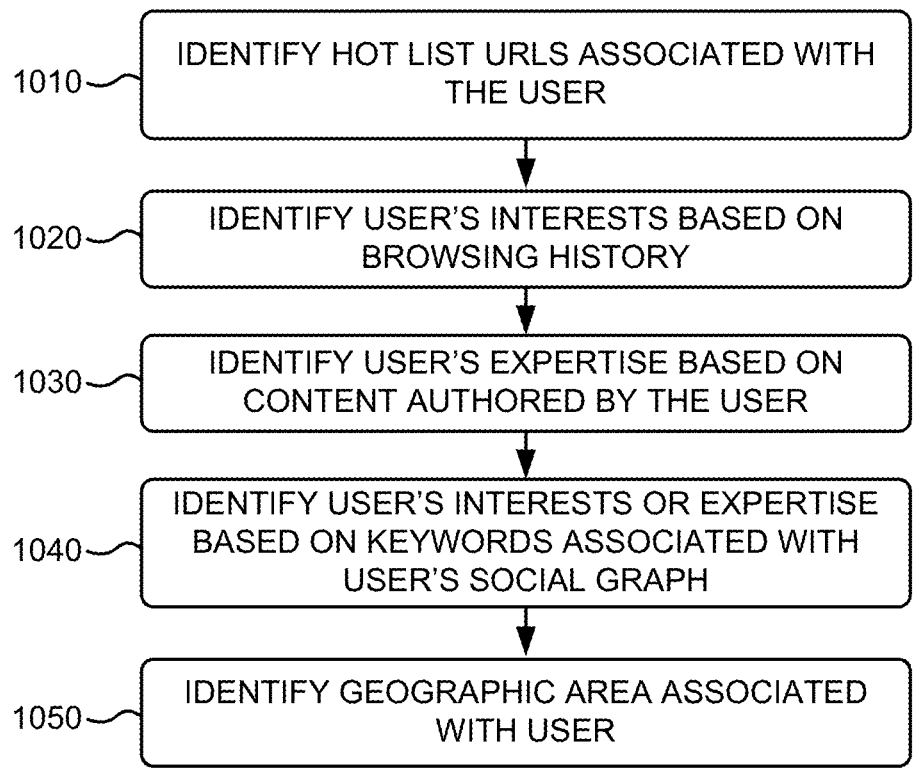
FIG. 10 is a flowchart of an exemplary process for determining subjective criteria, associated with a user, according to an implementation described herein.

FIG. 10 is a flowchart of an exemplary process for determining subjective criteria, associated with a user, according to an implementation described herein. In one implementation, the process of FIG. 10 may be performed by comments server 130. In other implementations, some or all of the process of FIG. 10 may be performed by another device or a group of devices separate from or including comments server 130. Subjective criteria associated with a user, determined by the process of FIG. 10, may be used to determine a user's interests and areas of expertise, which may be compared to topics associated with a document accessed by the user, to determine whether the user is likely to write a comment about the accessed document. Additionally or alternatively, the subjective criteria determined by the process of FIG. 10 may be used to adjust a user's author likelihood score if a document accessed by the user relates to the determined subjective criteria associated with the user. Furthermore, the subjective criteria determined by the process of FIG. 10 may be used to rank documents to provide a ranked list of documents, in need of comments, to the user.

The process of FIG. 10 may include identifying hot list URLs associated with the user (block 1010). For example, user statistics manager 420 (or comments add-on application 510) may identify URLs of documents in which the user has expressed a recent interest. A particular URL may be identified as a hot list URL, for example, if a user accesses a document, associated with the particular URL, at least a particular number of times within a particular time period. A particular URL may be identified as a hot list URL, for example, if the user has mentioned the particular URL, or provided a link to the particular URL, in a document associated with the user's social graph. For example, if the user mentions a particular document in a blog, a URL associated with the document may be identified as a hot list URL. A URL may also be identified as a hot list URL if the user is an author of a document identified by the URL. URLs identified as hot list URLs may be stored in URL hot list field 670 of user profile 600 associated with the user.

A user's interests may be identified based on browsing history (block 1020). For example, user statistics manager 420 (or comments add-on application 510) may identify keywords associated with documents browsed by the user within a particular time period. For example, keywords may be extracted from documents stored in a browser cache. Documents may be labeled with one or more categorical topics. The user's interests may also be determined based on topics associated with documents browsed by the user within a particular time period. Identified interests of the user may be stored in interests and expertise field 660 of user profile 600 associated with the user.

A user's expertise may be identified based on content authored by the user (block 1030). For example, user statistics manager 420 (or comments add-on application 510) may identify content authored by the user based on posts that the user makes to web sites associated with an area of expertise (e.g., forum or message board dedicated to a particular topic or an encyclopedic web site, such as WIKIPEDIA). A topic associated with a post authored by the user may be identified. For example, a topic associated with a web site, or a document on the web site, may be determined based on a topic tag or based on keywords analyzed from content of the web site, or a document on the web site. Identified areas of expertise of the user may be stored in interests and expertise field 660 of user profile 600 associated with the user.

A user's interests and expertise may be identified based on keywords associated with a user's social graph (block 1040). For example, user statistics manager 420 (or comments add-on application 510) may identify keywords that occur on documents associated with the user's social graph. For example, keywords that occur more than a particular number of times may be identified as interests or areas of expertise associated with the user. The identified keywords may be stored in interests and expertise field 660 of user profile 600 associated with the user.

In a particular implementation, interests or areas of expertise identified based on keywords associated with the user's social graph may be matched with interests identified based on the user's browsing history and/or areas of expertise identified based on content authored by the user to determine whether there is a correlation. The user's interests and/or areas of expertise may be stored in interests and expertise field 660 of user profile 600 associated with the user only if a correlation exists between the user's interests and areas of expertise identified based on keywords associated with the user's social graph and the user's interests identified based on browsing history or the user's areas of expertise based on content authored by the user.

A geographic area associated with a user may be identified (block 1050). For example, user statistics manager (or comments add-on application 510) may identify a geographic area associated with the user based on an Internet Protocol (IP) address associated with client device 110, information provided by a GPS receiver associated with client device 110, a multilateration process associated with receivers in communication with client device 110, or any other geolocation process.

Additionally or alternatively to the process of FIG. 10, a user's interests, areas of expertise, and/or geographic areas associated with the user may be determined by prompting the user to enter the user's interests, areas of expertise, and/or geographic areas associated with the user. Furthermore, in order to protect the user's privacy, one or more of the subjective criteria associated with the user may be determined locally by client add-on application 510 and stored in local user statistics database 520. Additionally or alternatively, a user may be prompted to give permission to provide personal information to comments server 130.

Figure 11:
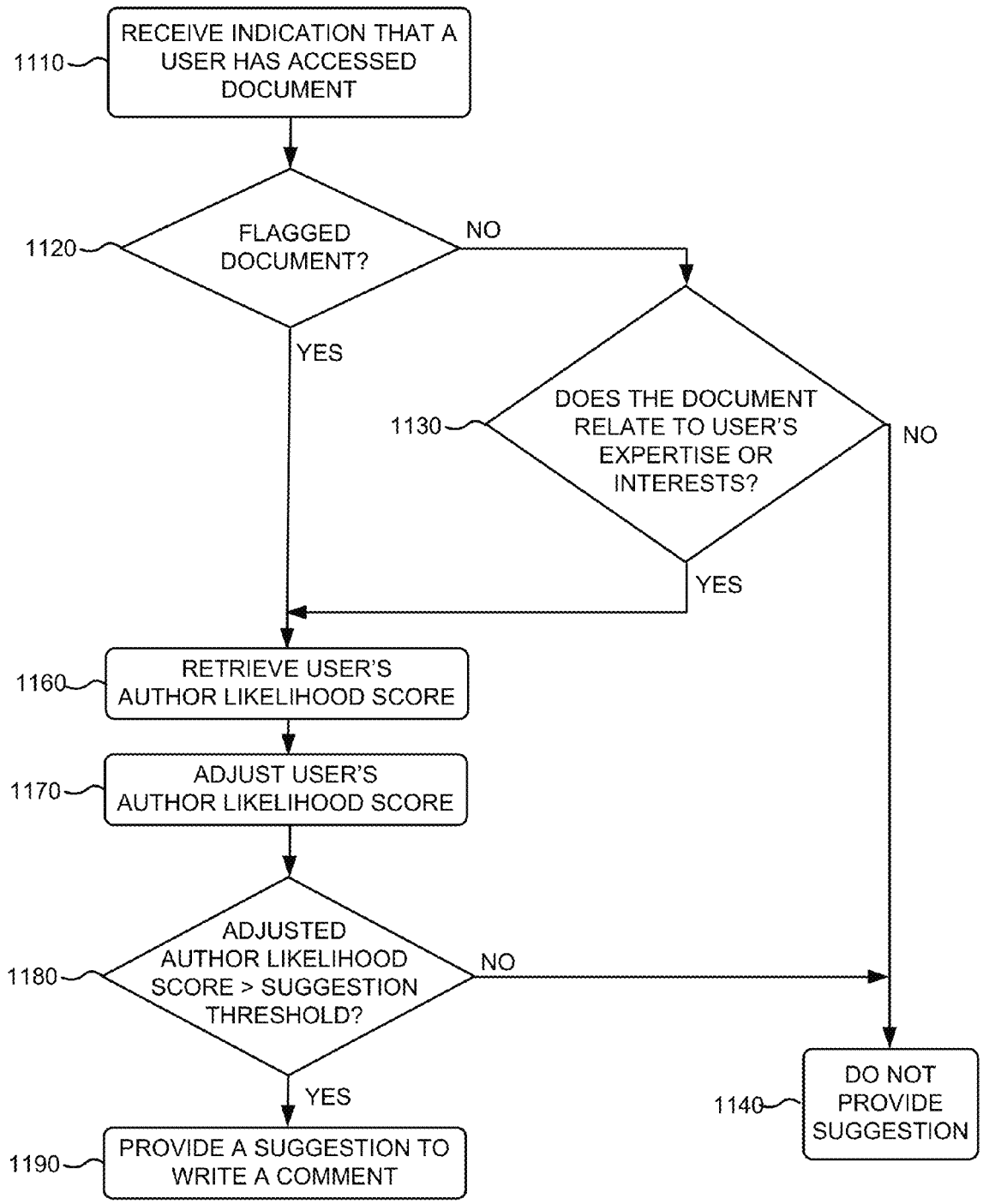
FIG. 11 is a flowchart of an exemplary process for providing a suggestion, to write a comment, to a user according to an implementation described herein.

FIG. 11 is a flowchart of an exemplary process for providing a suggestion, to write a comment, to a user according to an implementation described herein. In one implementation, the process of FIG. 11 may be performed by comments server 130. In other implementations, some or all of the process of FIG. 11 may be performed by another device or a group of devices separate from or including comments server 130.

The process of FIG. 11 may include receiving an indication that a user has accessed a document (block 1110). For example, suggestion manager 410 may receive an indication from comments add-on application 510 that a user has accessed a particular document. The indication may include, for example, information identifying the accessed document (e.g., a URL of the document) and information identifying the user (e.g., a string which may be used to locate user profile 600 associated with the user).

A determination may be made whether the accessed document has been flagged as needing comments (block 1120). For example, flagging component 450 may access flagged documents database 460 to determine whether document record 700 exits for the accessed document. If document record 700 exists for the accessed document, flagged component 450 may determine whether need comments flag 760 of document record 700 has been set.

If it is determined that the accessed document has not been flagged as needing comments (block 1120—NO), a determination may be made whether the accessed document relates to a user's expertise or interests (block 1130). For example, user statistics manager 420 may compare topics field 740 of document record 700 with interests and expertise field 660 of user profile 600 associated with the user. If no document record 700 exists for the accessed document, suggestion manager 410 may access the document and extract topic tags from metadata associated with the document.

Furthermore, a URL of the accessed document may be compared to a URL hot list associated with the user. For example, user statistics manager 420 may compare the URL of the accessed document to URL hot list field 670 of user profile 600 associated with the user. If the URL of the accessed document is on the URL hot list associated with the user, the document may be considered as being related to the user's interests.

If it is determined that the accessed document does not relate to a user's expertise or interests (block 1130—NO), no suggestion may be provided (block 1140). For example, suggestion manager 410 may not provide an instruction to comments add-on application 510 to display a suggestion to the user to write a comment for the document.

If it is determined that the accessed document relates to the user's expertise or interests (block 1130—YES), or if it is determined that the document has been flagged as needing comments (block 1120—YES), a user's author likelihood score may be retrieved (block 1160). For example, user statistics manager 420 may retrieve the user's author likelihood score from author likelihood score field 650 of user profile 600 associated with the user.

The user's author likelihood score may be adjusted (block 1170). For example, user statistics manager 420 may adjust the user's author likelihood score based on one or more criteria associated with the accessed document. For example, if the accessed document is related to the user's interests, areas of expertise, or geographic area, the user's author likelihood score may be increased by a particular value. A user may be more likely to write a comment about a document that relates to the user's interests, areas of expertise, or geographic area. As another example, if the accessed document is not associated with a language that the user understands, the user's author likelihood score may be decreased. A user may be less likely to write a comment about a document if the document is in a language that the user does not understand. As yet another example, if the document is on the user's URL hot list, the user's author likelihood score may be increased. A user may be more likely to write a comment about a document that has been associated with the user in some way. As yet a further example, a user's author likelihood score may be adjusted based on a time of day or day of week. A user may be more likely to write a comment for a document in the evening or on the weekend, when the user may have more free time, and less likely to write a comment during business hours.

The adjusted author likelihood score may be compared to a suggestion threshold (block 1180). For example, suggestion manager 410 may compare the adjusted author likelihood score to a suggestion threshold. If it is determined that the adjusted author likelihood score is less than or equal to the suggestion threshold (block 1180—NO), no suggestion may be provided (block 1140). For example, suggestion manager 410 may not provide an instruction to comments add-on application 510 to display a suggestion to the user to write a comment for the document.

If it is determined that the adjusted author likelihood score is greater than the suggestion threshold (block 1180—YES), a suggestion to write a comment may be provided to the user (block 1190). For example, suggestion manager 410 may send an instruction to comments add-on application to display a suggestion to the user to write a comment for the document. In one implementation, a suggestion may be provided a user if the user has installed comment add-on application 510. In another implementation, a suggestion may be provided to a user even if the user did not install comment application 510.

Figure 12:
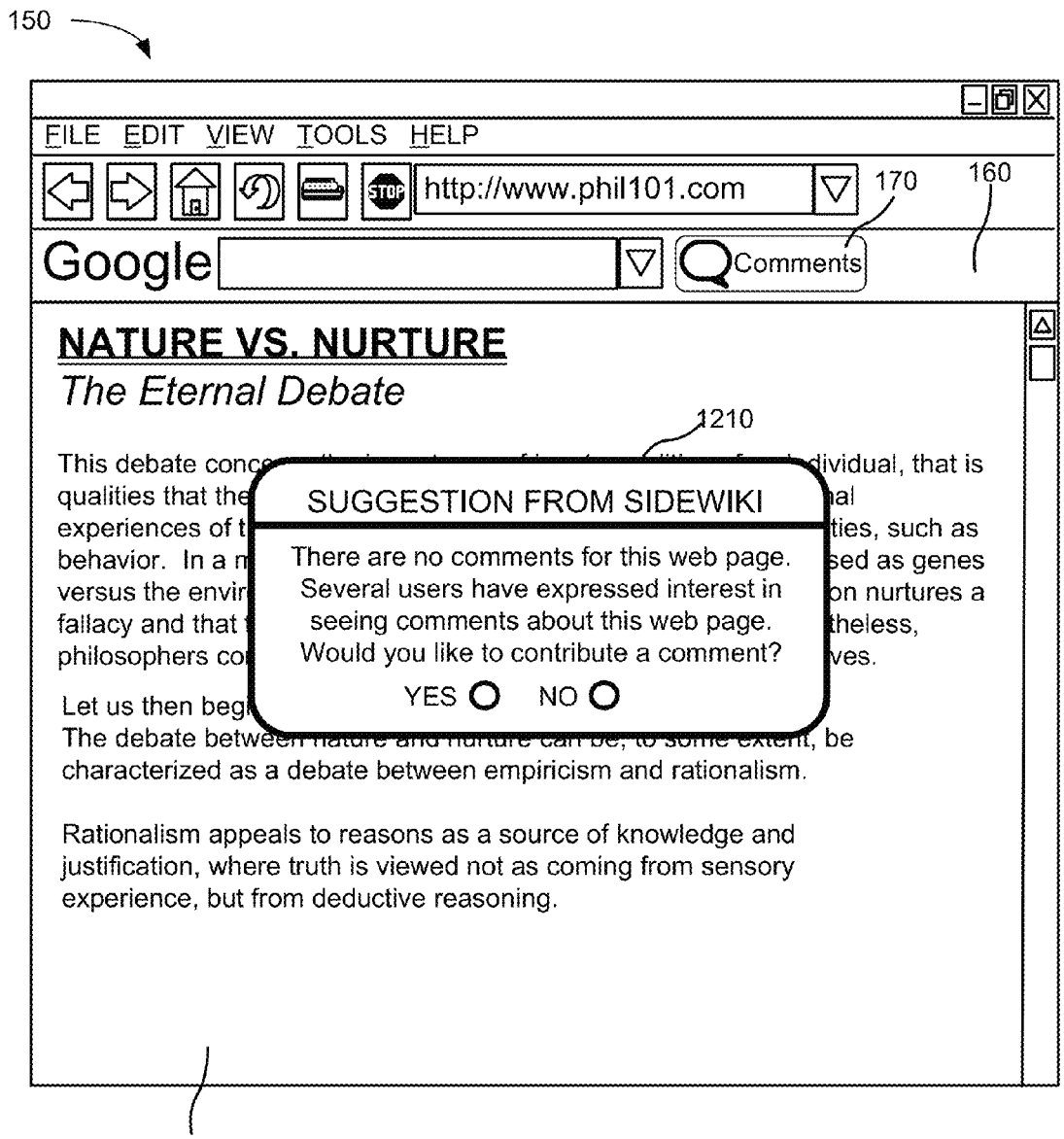
FIG. 12 is a diagram of an exemplary user interface for providing a suggestion, to write a comment, to a user according to an implementation described herein.

FIG. 12 is a diagram of an exemplary user interface for providing a suggestion, to write a comment, to a user according to an implementation described herein. As shown in FIG. 12, browser window 150 may include web page 101, toolbar 160, comments button 170, and suggestion 1210. While suggestion 1210 is shown in FIG. 12 as a window appearing on top of web page 101, suggestion 1210 may take other forms. For example, suggestion 1210 may appear as a text scrolling across the bottom of browser window 150, as a change in an appearance of comment button 170, as a tooltip associated with comments button 170, as a static status bar appearing on, above or below toolbar 160, as an audible message, as an animation, or as a combination thereof.

Although FIG. 12 shows exemplary elements of browser window 150, in other implementations, browser window 150 may contain fewer elements, different elements, additional elements, or differently arranged elements than depicted in FIG. 12.

Figure 13:
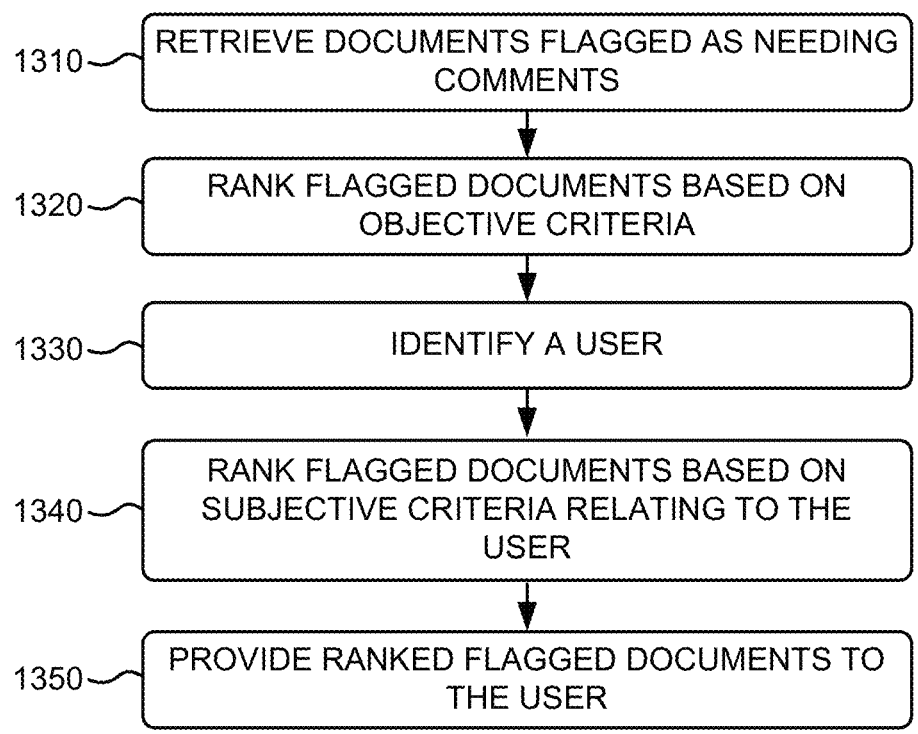
FIG. 13 is a flowchart of an exemplary process for providing ranked flagged documents to a user according to an implementation described herein.

FIG. 13 is a flowchart of an exemplary process for providing ranked flagged documents to a user according to an implementation described herein. In one implementation, the process of FIG. 13 may be performed by comments server 130. In other implementations, some or all of the process of FIG. 13 may be performed by another device or a group of devices separate from or including comments server 130.

The process of FIG. 13 may include retrieving documents flagged as needing comments (block 1310). For example, ranking component 440 may retrieve flagged documents from flagged documents database 460. Flagged documents may be ranked based on objective criteria (block 1320). For example, ranking component 440 may rank flagged documents based on objective criteria and may assign an objective rank score to the flagged documents. An objective rank score for a particular document may be based on one or more objective criteria, including a quantity of explicit comment requests associated with the particular document, a quantity of implicit comment requests associated with the particular document, a recency of the particular document (e.g., how long ago the particular document was created), a measure of popularity of the particular document, a measure of popularity of the particular document with regards to a particular popular topic, or a measure of popularity of the particular document with regards to one or more blogging or microblogging web sites. A score may be computed for the particular document for each objective criterion and the scores may be combined, based on a weighted sum, into an objective rank score.

A user may be identified (block 1330). For example, suggestion manager 410 may identify a particular user that has requested a list of ranked documents in need of comments, based on the user accessing a particular URL or activating a particular function of comments add-on application 510. For example, comments add-on application 510 may include a button or a menu item to provide to a user with a list of documents in need of comments.

Flagged documents may be ranked based on subjective criteria relating to the identified user (block 1340). For example, ranking component 440 may rank flagged documents based on subjective criteria relating to the identified user and may assign a subjective rank score to the flagged documents. A subjective rank score for a particular document may be based on one or more subjective criteria, including whether the particular document relates to the identified user's interests or areas of expertise, whether the particular document is included in the user's URL hot list, whether the particular document is associated with the user's geographic area, or whether the particular document is associated with the user's language. A score may be computed for the particular document for each subjective criterion and one or more of the scores may be combined, based on a weighted sum, into a subjective rank score.

A ranked list of flagged documents may be provided to the user (block 1350). For example, suggestion manager 410 may receive one or more lists of ranked flagged documents from ranking component 440, and may provide the one or more ranked lists to comments add-on application 510 of client device 110. Comments add-on application 510 may display the one or more ranked lists to the user. The one or more ranked lists of documents in need of comments may be provided to the user in response to a user requesting to see the list. For example, a user may activate a particular function associated with comments add-on application 510, which may cause the list to be displayed to the user. Additionally or alternatively, a list of ranked documents in need of comments may be provided to the user at particular intervals via, for example, an email message.

In one implementation, objective and subjective scores of documents may be combined and a single list of ranked documents may be provided to the user. In another implementation, a group of lists may be provided to the user, where each list is associated with a different type of document.

Figure 14:
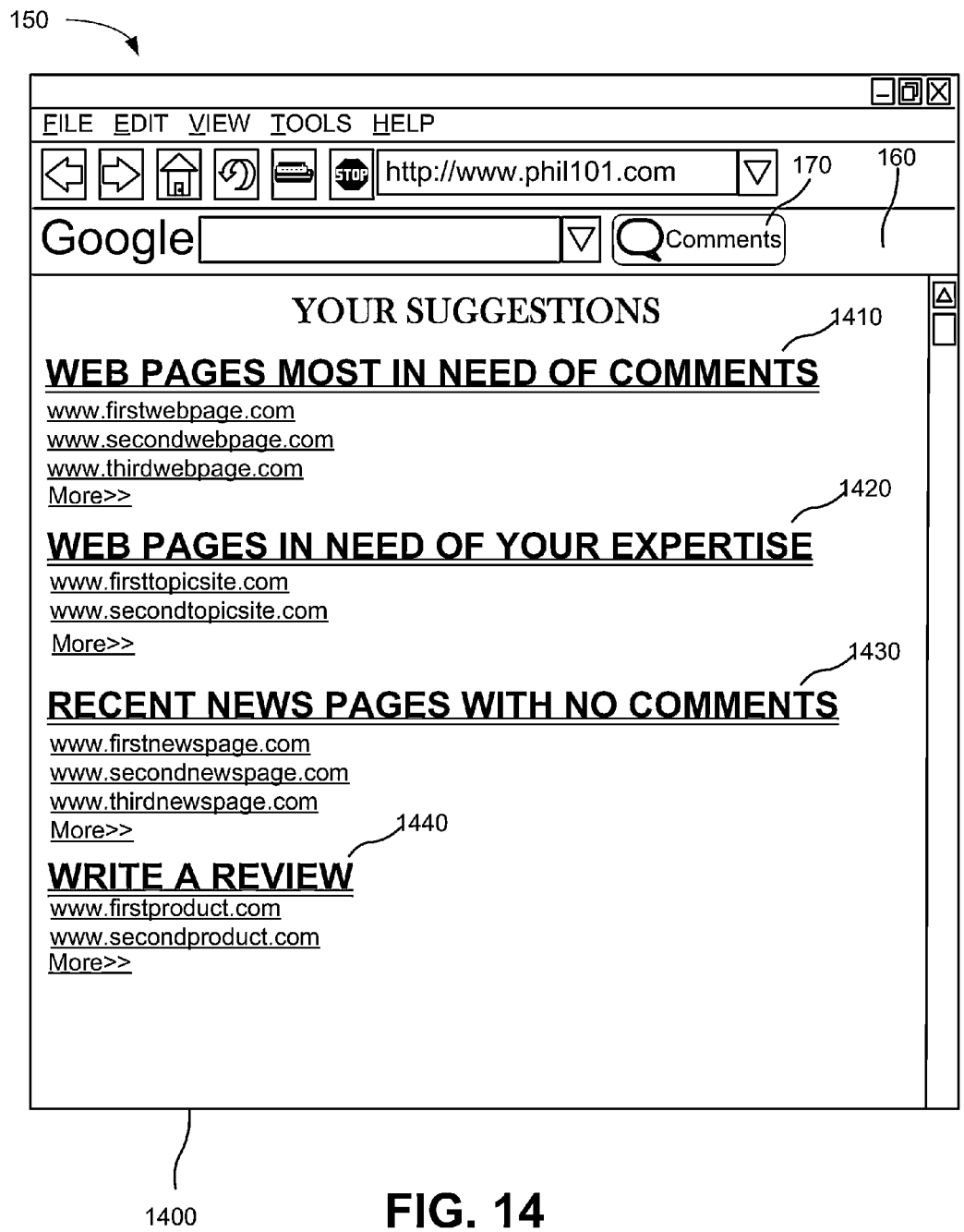
FIG. 14 is a diagram of an exemplary user interface for providing documents in need of comments to a user.

FIG. 14 is a diagram of an exemplary user interface for providing documents in need of comments to a user. As shown in FIG. 14, browser window 150 may include toolbar 160, comments button 170, and suggestion web page 1400. Suggestion web page 1400 may include one or more ranked lists of documents identified as needing comments. For example, suggestion web page 1400 may include a first list 1410, a second list 1420, a third list 1430, and a fourth list 1440.

First list 1410 may include a global list of documents in need of comments ranked based on objective criteria. Second list 1420 may include a list of documents in need of comments ranked based on subjective criteria associated with the user. For example, second list 1420 may include documents relating to the user's areas of expertise. Third list 1430 may include documents, in need of comments, that have been categorized as recent news documents, and may be ranked based on both objective and subjective criteria. Fourth list 1440 may include documents, in need of comments, that are associated with consumer products, and may be ranked based on subjective criteria (e.g., based on the user's interests).

Although FIG. 14 shows exemplary elements of browser window 150, in other implementations, browser window 150

Example

Figure 15:
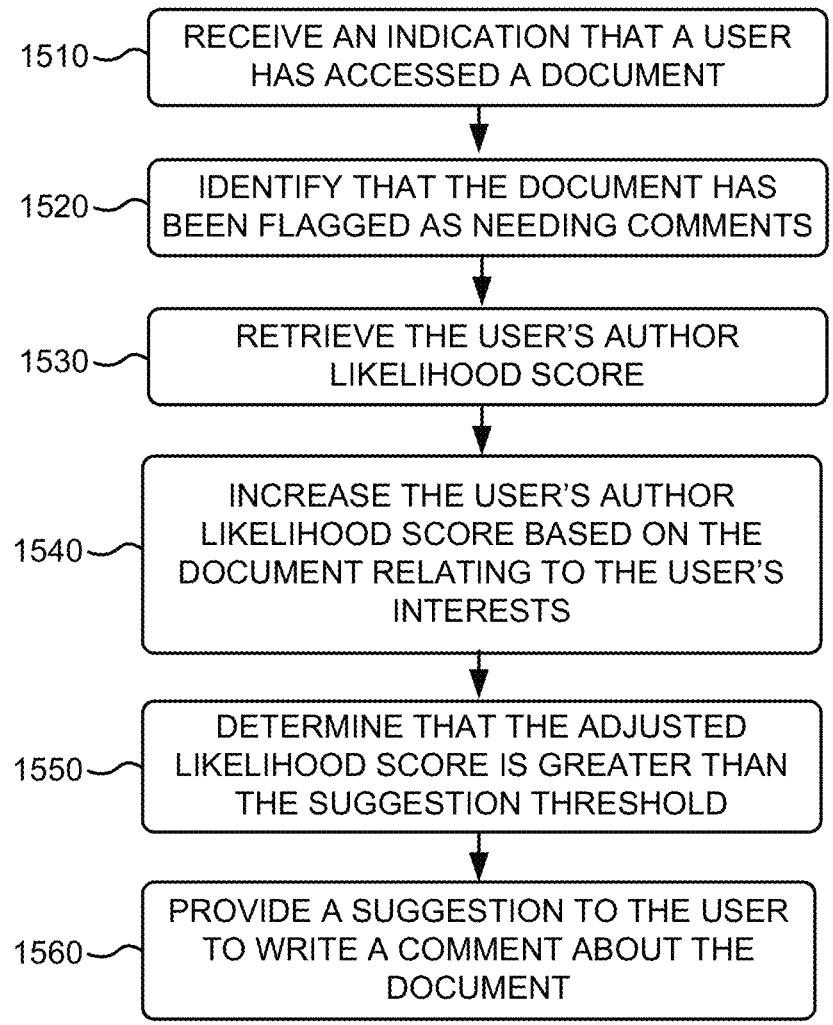
FIG. 15 is a flowchart of a process illustrating an example of determining whether to provide a suggestion, to write a comment, to a user according to an implementation described herein.

FIG. 15 is a flowchart of a process illustrating an example of determining whether to provide a suggestion, to write a comment, to a user according to an implementation described herein. In one implementation, the process of FIG. 15 may be performed by comments server 130. In other implementations, some or all of the process of FIG. 15 may be performed by another device or a group of devices separate from or including comments server 130.

The process of the example of FIG. 15 may include receiving an indication that a user has accessed a document (block 1510). For example, comments add-on application 510 may send an indication to comments server 130 that the user has accessed the document. The indication may include a URL identifying the document and a user identification string that may be used to identify a user profile associated with a user.

The accessed document may be identified as flagged as needing comments (block 1520). For example, flagging component 450 may determine that a document record 700 exists that is associated with the received URL and that need comments flag 760 of document record 700 has been set.

The user's likelihood score may be retrieved from author likelihood score field 650 of user profile 600 associated with the received user identification string (block 1530). Assume that the user has written 2 comments within the last couple of weeks and based on this fact, the comment productivity score of the user has been set to 0.2. Further assume that the user does not post frequently to web sites associated with the user's social graph and that the user's social graph productivity score has been set to 0. Further assume that the user has written one WIKIPEDIA article in the last month and based on this fact, the user's expert postings score has been set to 0.1. Assume that in this particular implementation, the user's author likelihood score is based on a sum of the user's comment productivity score, the user's social graph productivity score, and the user's expert postings score. Thus, the user's author likelihood score may in this case be 0.3.

User statistics manager 420 may compare topics field 740 of document record 700 of the accessed document with interests and expertise field 660 of user profile 600 associated with the user and determine that the document is related to an interest of the user. For example, assume that the user frequently browses documents tagged with a "gardening" topic, and that the accessed document is also tagged with a "gardening" topic. Thus, the user's author likelihood score may be increased based on a topic associated with the document relating to an interest of the user (block 1540). In this case, assume user statistics manager 420 increases the user's author likelihood score by 0.1 to 0.4.

A determination may be made that the adjusted user's author likelihood score is greater than a suggestion threshold (block 1550). For example, assume the suggestion threshold has been set to 0.3 and thus the user's adjusted author likelihood score of 0.4 is greater than the suggestion threshold. In response, a suggestion may be provided to the user to write a comment about the document (block 1560). For example, suggestion manager 410 may send an instruction to comment add-on application 510 to provide a suggestion, and comment add-on application 510 may display suggestion 1210 in browser window 150.

CONCLUSION

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8A, 9-11, 13, and 15, the order of the blocks may be modified in other implementations. Further, non-dependent blocks may be performed in parallel.

Also, certain portions of the implementations may have been described as "logic" or a "component" that performs one or more functions. The terms "logic" or "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

It should be emphasized that the term "comprises/comprising," when used in this specification, is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
   storing, by a processor associated with the one or more server devices, a user profile that includes an author likelihood score of a particular user,
      the author likelihood score estimating a likelihood that the particular user will become an author of comments;
   receiving, by a processor associated with the one or more server devices and from users, one or more explicit requests for comments for a particular document,
      the one or more explicit requests for comments being associated with the users selecting a visual object to request comments about the particular document when the particular document is a document without comments;
   receiving, by a processor associated with the one or more server devices, an indication that the particular user has accessed flail the particular document;
   determining, by a processor associated with the one or more server devices, that the particular document has been identified as needing comments when a quantity of the one or more explicit requests for comments, received for the particular document, exceeds a threshold;

retrieving, by a processor associated with the one or more server devices and from the user profile, the author likelihood score for the particular user, based on determining that the particular document has been identified as needing comments;

determining, by a processor associated with the one or more server devices, whether the retrieved author likelihood score is greater than a particular threshold; and providing, by a processor associated with the one or more server devices, a suggestion to the particular user to write a comment about the particular document, based on:

determining that the retrieved author likelihood score is greater than the particular threshold, and determining that the particular document has been identified as needing comments.

2. The method of claim 1, further comprising:
receiving one or more implicit requests for comments for the particular document from one or more users,
where the one or more implicit requests for comments are associated with the one or more users selecting a visual object to view comments associated with the particular document; and
identifying the particular document as needing comments when a quantity of the one or more implicit requests for comments, received for the particular document, exceeds a threshold.

3. The method of claim 1, further comprising:
identifying the particular document as a document without comments,
where content of the particular document relates to recent events, and
where the particular document was created within a particular time period as measured from a current time; and
identifying the particular document as needing comments based on:
identifying the particular document as a document without comments,
the content relating to recent events, and
the particular document being created within a particular time period as measured from a current time.

4. The method of claim 1, further comprising:
identifying the particular document as a document without comments,
where the particular document is associated with a product, a business, a book, or a published paper; and
identifying the particular document as needing comments based on:
identifying the particular document as a document without comments, and
the particular document being associated with a product, a business, a book, or a published paper.

5. The method of claim 1, further comprising:
identifying the particular document as a document without comments,
where the particular document is associated with at least a particular rank score with respect to a particular topic; and
identifying the particular document as needing comments based on:
identifying the document as a document without comments, and
the particular document being associated with at least the particular rank score with respect to the particular topic.

6. The method of claim 1, further comprising:
identifying the particular document as a document without comments,
where the particular document is mentioned at least a particular quantity of times, within a particular time period, on blogging or microblogging web sites; and
identifying the particular document as needing comments based on:
identifying the particular document as a document without comments, and
the particular document being mentioned at least the particular number of times, within the particular time period, on the blogging or the microblogging web sites.

7. The method of claim 1, further comprising:
determining a comment productivity score for the particular user based on a quantity of comments authored by the particular user;
determining a social graph productivity score for the particular user based on a quantity of content authored by the particular user in association with accounts associated with a social graph of the particular user;
determining an expert postings score for the particular user based on a quantity of content authored by the particular user for web sites associated with particular areas of expertise of the particular user; or
determining the author likelihood score for the particular user based on the comment productivity score, the social graph productivity score, or the expert postings score.

8. The method of claim 1, further comprising:
adjusting the author likelihood score for the particular user based on one or more subjective criteria associated with the particular user,
where determining whether the retrieved author likelihood score is greater than the particular threshold includes:
determining whether the adjusted author likelihood score is greater than the particular threshold.

9. The method of claim 8, where the one or more subjective criteria include at least one of:
interests associated with the particular user;
areas of expertise associated with the particular user;
a geographic area associated with the particular user; or
a list of uniform resource locators associated with the particular user.

10. The method of claim 1, further comprising:
receiving a request, from the particular user, for a ranked list of documents identified as needing comments; and
providing the ranked list of documents, identified as needing comments, based on receiving the request.

11. The method of claim 10, further comprising:
ranking documents, to form the ranked list of documents identified as needing comments, based on one or more objective criteria associated with the documents.

12. The method of claim 11, where the one or more objective criteria include at least one of:
a quantity of explicit comment requests associated with the documents;
a quantity of implicit comment requests associated with the documents;
a recency of the documents;
a popularity score of the documents;
a popularity score of the documents with respect to a particular category; or a popularity score of the documents with respect to one or more blogging or microblogging web sites.

13. The method of claim 10, further comprising:
ranking documents, to form the ranked list of documents identified as needing comments, based on one or more subjective criteria associated with the particular user,
where providing the ranked list of documents includes:
providing the ranked list of documents to the particular user with a suggestion, to the particular user, to write a comment about one or more of the documents in the ranked list of documents.

14. The method of claim 13, where the one or more subjective criteria include at least one of:
whether the documents are included in a list of documents associated with the particular user,
whether the documents are associated with a geographic area of the particular user,
whether the documents are associated with a language of the particular user,
whether the documents are associated with interests of the particular user, or
whether the documents are associated with areas of expertise of the particular user.

15. A server device comprising:
a memory to store a user profile that includes an author likelihood score of a particular user,
where the author likelihood score estimates a likelihood that the particular user will become an author of comments; and
a processor to execute instructions to:
determine the author likelihood score for the particular user,
receive one or more implicit requests for comments for a particular document from users,
the one or more implicit requests for comments being associated with the users selecting a visual object to view comments associated with the particular document,
receive an indication that the particular user has accessed the particular document,
determine, after receiving the indication, that the particular document has been identified as needing comments when a quantity of the one or more implicit requests for comments, received for the particular document, exceeds a threshold,
determine whether the author likelihood score of the particular user is greater than a particular threshold, when the particular document has been identified as needing comments, and
provide a suggestion to the particular user to write a comment about the particular document when:
the author likelihood score of the particular user is greater than the particular threshold, and
the particular document has been identified as needing comments.

16. The server device of claim 15, where the processor is further to:
receive one or more explicit requests for comments for the particular document from one or more users,
where the one or more explicit requests for comments are associated with the one or more users selecting a visual object to request comments about the particular document when the particular document is a document without comments, and
identify the particular document as needing comments when a quantity of the one or more explicit requests for comments, received for the particular document, exceeds a threshold.

17. The server device of claim 15, where the processor is further to:
identify the particular document as a document without comments;
at least one of:
identify the particular document as needing comments based on: the particular document being identified as a document without comments, content of the particular document relating to recent news events, and the particular document being created within a particular time period as measured from a current time;
identify the particular document as needing comments based on: identifying the particular document being identified as a document without comments, and the particular document being associated with a product, a business, a book, or a published paper;
identify the particular document as needing comments based on: the particular document being identified as a document without comments, and the particular document being associated with at least a particular rank score with respect to a particular topic; or
identify the particular document as needing comments based on: the particular document being identified as a document without comments, and the particular document being mentioned at least a particular quantity of times, within a particular time period, on blogging or microblogging web sites.

18. The server device of claim 15, where the processor is further to:
determine a comment productivity score for the particular user based on a quantity of comments authored by the particular user;
determine a social graph productivity score for the particular user based on a quantity of content authored by the particular user in association with accounts associated with a social graph of the particular user; or
determine an expert postings score for the particular user based on a quantity of content authored by the particular user for web sites associated with particular areas of expertise of the particular user,
where, when determining the author likelihood score, the processor is to determine the author likelihood score for the particular user based on the comment productivity score, the social graph productivity score, or the expert postings score.

19. A non-transitory computer-readable medium storing instructions, the instructions comprising:
one or more instructions which, when executed by one or more server devices, cause the one or more server devices to store a user profile that includes an author likelihood score of a particular user,
the author likelihood score estimating a likelihood that the particular user will become an author of comments;
one or more instructions which, when executed by the one or more server devices, cause the one or more server devices to receive an indication that the particular user has accessed a particular document;
one or more instructions which, when executed by the one or more server devices, cause the one or more server devices to determine that the particular document has been identified as needing comments based on information indicating that at least one user has requested comments about the particular document;

one or more instructions which, when executed by the one or more server devices, cause the one or more server devices to determine that the particular document relates to areas of expertise of the particular user;

one or more instructions which, when executed by the one or more server devices, cause the one or more server devices to retrieve, from the user profile, the author likelihood score for the particular user based on:

the particular document being identified as needing comments, and the particular document relating to the areas of expertise of the particular user;

one or more instructions which, when executed by the one or more server devices, cause the one or more server devices to adjust the retrieved author likelihood score based on one or more subjective criteria relating to the particular user with respect to a plurality of:

a list of documents associated with the particular user, a geographic area of the particular user, interests of the particular user, or a language of the particular user;

one or more instructions which, when executed by the one or more server devices, cause the one or more server devices to determine whether the adjusted author likelihood score is greater than a particular threshold; and one or more instructions which, when executed by the one or more server devices, cause the one or more server devices to provide an instruction, to a client device associated with the particular user, to provide a suggestion to the particular user to write a comment about the particular document, when the adjusted author likelihood score is greater than the particular threshold.

20. The non-transitory computer-readable medium of claim 19, the instructions further comprising:

one or more instructions to determine a comment productivity score for the particular user based on a quantity of comments authored by the particular user;

one or more instructions to determine a social graph productivity score for the particular user based on a quantity of content authored by the particular user in association with accounts associated with a social graph of the particular user; or one or more instructions to determine an expert postings score for the particular user based on a quantity of content authored by the particular user for web sites associated with particular areas of expertise; and one or more instructions to determine the author likelihood score for the particular user based on the comment productivity score, the social graph productivity score, or the expert postings score.

21. The non-transitory computer-readable medium of claim 19, the instructions further comprising:

one or more instructions to receive one or more explicit requests for comments for the particular document from users, where the one or more explicit requests for comments are associated with the users selecting a visual object to request comments about the particular document when the particular document is a document without comments; or one or more instructions to receive one or more implicit requests for comments for the particular document from one or more users, where the one or more implicit requests for comments are associated with the one or more users selecting a visual object to view comments associated with the particular document; and one or more instructions to identify the particular document as needing comments when at least one of:

a quantity of the one or more explicit requests for comments, received for the particular document, exceeds a threshold relating to explicit requests for comments, or a quantity of the one or more implicit requests for comments, received for the particular document, exceeds a threshold relating to implicit requests for comments.

* * * * *

UNITED STATES PATENT AND TRADEMARK OFFICE
CERTIFICATE OF CORRECTION

PATENT NO.        : 9,032,289 B1
APPLICATION NO.   : 12/816816
DATED             : May 12, 2015
INVENTOR(S)       : Michal Cierniak et al.

Page 1 of 1

It is certified that error appears in the above-identified patent and that said Letters Patent is hereby corrected as shown below:

In the claims,

Please correct Claim 17 as follows:

Column 30, line 18, remove "identifying"

Signed and Sealed this
Twentieth Day of October, 2015

Michelle K. Lee
*Director of the United States Patent and Trademark Office*